United States Patent
Liu et al.

(10) Patent No.: US 11,962,897 B2
(45) Date of Patent: Apr. 16, 2024

(54) CAMERA MOVEMENT CONTROL METHOD AND APPARATUS, DEVICE, AND STORAGE MEDIUM

(71) Applicant: Tencent Technology (Shenzhen) Company Limited, Guangdong (CN)

(72) Inventors: Qi Liu, Guangdong (CN); Guangzhou Zhai, Guangdong (CN); Weihua Cui, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 237 days.

(21) Appl. No.: 17/675,293

(22) Filed: Feb. 18, 2022

(65) Prior Publication Data

US 2022/0174206 A1 Jun. 2, 2022

Related U.S. Application Data

(63) Continuation of application No. PCT/CN2020/126463, filed on Nov. 4, 2020.

(30) Foreign Application Priority Data

Jan. 17, 2020 (CN) .......................... 202010055703.X

(51) Int. Cl.
*H04N 23/661* (2023.01)
*H04N 23/62* (2023.01)

(52) U.S. Cl.
CPC ........... *H04N 23/661* (2023.01); *H04N 23/62* (2023.01)

(58) Field of Classification Search
CPC .. H04N 23/661; H04N 23/62; H04N 21/4781; H04N 23/67; H04N 23/695; A63F 13/35; A63F 13/5258
See application file for complete search history.

(56) References Cited

U.S. PATENT DOCUMENTS 8,576,235 B1 11/2013 Sumner et al.
10,154,228 B1 * 12/2018 Van Tuyl Bentley ......................
H04N 23/698

(Continued)

FOREIGN PATENT DOCUMENTS

CN 104793643 A 7/2015
CN 105597311 A 5/2016

(Continued)

OTHER PUBLICATIONS

Supplementary European Office Action dated Oct. 14, 2022 in Application No. 20914246.2. (10 pages).

(Continued)

*Primary Examiner* — Christopher K Peterson
(74) *Attorney, Agent, or Firm* — ARENTFOX SCHIFF LLP

(57) ABSTRACT

Some aspects of the disclosure provide a method for camera operation control in an electronic device. The method includes obtaining, based on a plurality of frames associated with a target time slice, a first target parameter to be met by a camera of a virtual camera system in the target time slice. Then, the method includes determining a target operation speed of the camera in the target time slice at least partially based on the first target parameter and a time-speed change magnification curve, and controlling the camera to operate based on the target operation speed. Apparatus and non-transitory computer-readable storage medium counterpart embodiments are also contemplated.

20 Claims, 7 Drawing Sheets

(56) References Cited

U.S. PATENT DOCUMENTS

| | | | |
|---|---|---|---|
| 2013/0244782 A1 | | 9/2013 | Newcombe et al. |
| 2014/0243082 A1 | | 8/2014 | Harris et al. |
| 2015/0156422 A1 | * | 6/2015 | Neufeld ............... H04N 23/635 |
| | | | 348/240.3 |

FOREIGN PATENT DOCUMENTS

| | | | |
|---|---|---|---|
| CN | 106502395 | A | 3/2017 |
| CN | 106582012 | A | 4/2017 |
| CN | 106730852 | A | 5/2017 |
| CN | 106780874 | A | 5/2017 |
| CN | 107422848 | A | 12/2017 |
| CN | 109550246 | A | 4/2019 |
| CN | 109621415 | A | 4/2019 |
| CN | 110170167 | A | 8/2019 |
| CN | 111246095.4 | | 6/2020 |
| EP | 1454663 | A1 | 9/2004 |
| EP | 2030661 | A2 | 3/2009 |
| WO | 2015164155 | A1 | 10/2015 |

OTHER PUBLICATIONS

International Search Report and Written Opinion dated Jan. 25, 2021 in International Application No. PCT/CN2020/126463 with English translation, 11 pgs.

Chinese Office Action dated Nov. 24, 2020 in Chinese Application No. 202010055703. X, 6 pgs.

\* cited by examiner

CAMERA MOVEMENT CONTROL METHOD AND APPARATUS, DEVICE, AND STORAGE MEDIUM

RELATED APPLICATIONS

This application is a continuation of International Application No. PCT/CN2020/126463, entitled "CAMERA MOVEMENT CONTROL METHOD AND APPARATUS, DEVICE, AND STORAGE MEDIUM" and filed on Nov. 4, 2020, which claims priority to Chinese Patent Application No. 202010055703.X, filed on Jan. 17, 2020 and entitled "CAMERA MOVEMENT CONTROL METHOD AND APPARATUS, DEVICE, AND STORAGE MEDIUM". The entire disclosures of the prior applications are hereby incorporated by reference in their entirety.

FIELD OF THE TECHNOLOGY

Embodiments of this disclosure relate to the field of computer technologies including a camera movement control method and apparatus, a device, and a storage medium.

BACKGROUND OF THE DISCLOSURE

With the rapid development of game technologies, increasingly more game clients provide a directed mode for a user. In a process that the user watches a game video by using the directed mode, the game client can control a directed camera to move, to focus the directed camera on a wonderful game scene, thereby improving game video watching experience of the user.

SUMMARY

Embodiments of this disclosure provide a camera operation (e.g., movement and scaling) control method and apparatus, a device, and a storage medium, which are used to improve a camera operation (e.g., movement and scaling) control effect.

Some aspects of the disclosure provide a method for camera operation control in an electronic device. The method includes obtaining, based on a plurality of frames associated with a target time slice, a first target parameter to be met by a camera of a virtual camera system in the target time slice. Then, the method includes determining a target operation speed of the camera in the target time slice at least partially based on the first target parameter and a time-speed change magnification curve, and controlling the camera to operate based on the target operation speed.

Some aspects of the disclosure provide an apparatus that includes processing circuitry. The processing circuitry is configured to obtain, based on a plurality of frames associated with a target time slice, a first target parameter to be met by a camera of a virtual camera system in the target time slice. Further, the processing circuitry is configured to determine a target operation speed of the camera in the target time slice at least partially based on the first target parameter and a time-speed change magnification curve, and control the camera to operate based on the target operation speed.

Some aspects of the disclosure provide a non-transitory computer-readable medium storing instructions which when executed by a computer cause the computer to perform the method for camera operation control.

The technical solutions provided in the embodiments of this disclosure may bring the following beneficial effects: a first target parameter that needs to be met by a camera in a target time slice is obtained based on data of a plurality of target frames, so that the reliability of the first target parameter is relatively high, which helps improve the stability of camera operation (e.g., movement and scaling). In addition, the camera operation (e.g., movement and scaling) is controlled based on a time-speed change magnification curve, which helps improve the operation (e.g., movement and scaling) continuity of the camera between adjacent time slices, so that the stability of the operation (e.g., movement and scaling) process of the camera is relatively high, and the camera operation (e.g., movement and scaling) control effect is relatively good.

BRIEF DESCRIPTION OF THE DRAWINGS

To describe the technical solutions of the embodiments of this disclosure more clearly, the following briefly introduces the accompanying drawings required for describing the embodiments. The accompanying drawings in the following description show some embodiments of this disclosure.

DESCRIPTION OF EMBODIMENTS

To make the objectives, technical solutions, and advantages of this disclosure clearer, the following further describes implementations of this disclosure in detail with reference to the accompanying drawings.

In this specification, claims, and accompanying drawings of this disclosure, the terms "first", "second", and so on are intended to distinguish similar objects but do not necessarily indicate a specific order or sequence. It is to be understood that such used data is interchangeable where appropriate so that the embodiments of this disclosure described here can be implemented in an order other than those illustrated or described here. The implementations described in the following exemplary embodiments do not represent all implementations that are consistent with this disclosure. On the contrary, the implementations are merely examples of apparatuses and methods that are described in detail in the appended claims and that are consistent with some aspects of this disclosure.

With the rapid development of game technologies, increasingly more game clients provide a directed mode for a user. For example, a video game can include a virtual camera system that provides various modes for respective users to select to view the game video. The virtual camera system can include a virtual camera (also referred to as camera) or a set of virtual cameras for providing a view or views of a virtual scene. A camera in the virtual camera system can be controlled to simulate operations of real camera in order to generate a view of the virtual scene from various positions, angles, scales, and the like. For example, when a user selects the directed mode, a directed camera can automatically move along with game pace, and display wonderful teamfight or some important moments to the user on the premise that the user does not need to perform any operation. In other words, in a process that the user watches a game video by using the directed mode, the game client can control the directed camera to move, to focus the directed camera on a wonderful game scene, thereby improving game video watching experience of the user. In some examples, a camera in the virtual camera system can be referred to as a lens in the virtual camera system, and camera control can be referred to as lens control.

Figure 1:
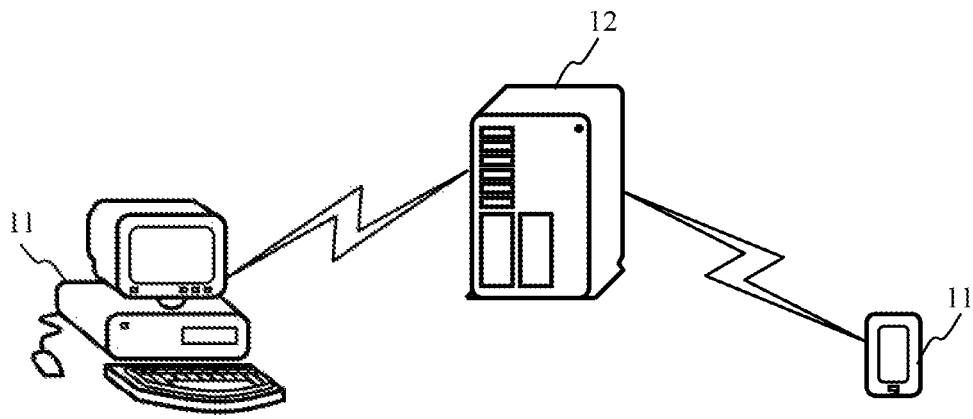
FIG. 1 is a schematic diagram of an implementation environment of a camera operation (e.g., movement and scaling) control method according to an embodiment of this disclosure.

In view of this, the embodiments of this disclosure provide a camera operation (e.g., movement and scaling) control method, and FIG. 1 is a schematic diagram of an implementation environment of a camera operation (e.g., movement and scaling) control method according to an embodiment of this disclosure. The implementation environment includes a terminal 11 and a server 12.

A game client that can provide a directed mode is installed in the terminal 11, and under a directed mode, the game client in the terminal 11 can apply the method provided in the embodiments of this disclosure to control a camera to move. The camera in this embodiment of this disclosure is a directed camera under the directed mode, and a scene focused by the directed camera is a scene that the user sees under the directed mode. In some embodiments, the server 12 refers to a backend server of the game client installed in the terminal 11, and the server 12 can provide data support to the game client installed in the terminal 11.

In some embodiments, the terminal 11 is a smart device such as a mobile phone, a tablet computer, or a personal computer. The server 12 is a server, or a server cluster including a plurality of servers, or a cloud computing service center. The terminal 11 and the server 12 establish a communication connection through a wired or wireless network.

It is noted that the terminal 11 and server 12 are only examples, and other related or potential terminals or servers that are applicable to this disclosure are also to be included in the protection scope of this disclosure, and are included herein by reference.

Figure 2:
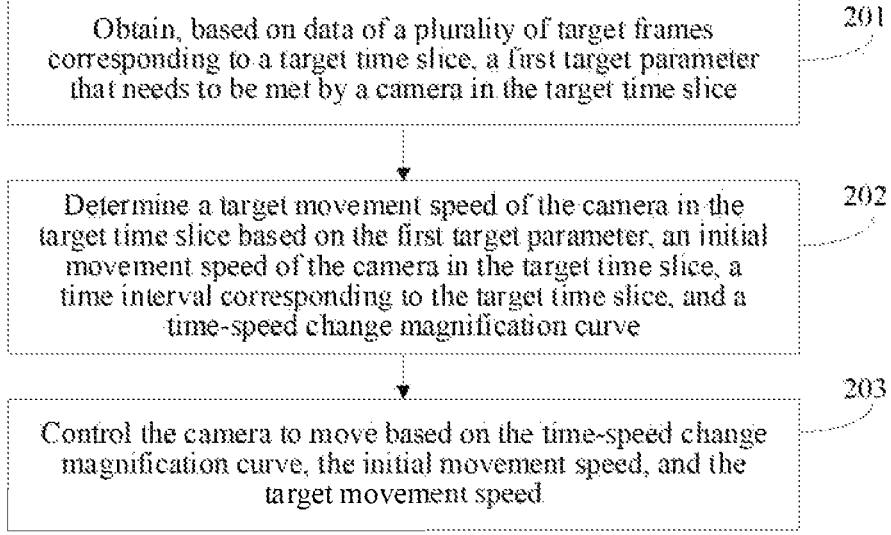
FIG. 2 is a flowchart of a camera operation (e.g., movement and scaling) control method according to an embodiment of this disclosure.

Based on the implementation environment shown in FIG. 1, an embodiment of this disclosure provides a camera operation (e.g., movement and scaling) control method by using an example in which the method is applicable to a game client in a terminal. As shown in FIG. 2, the method provided in this embodiment of this disclosure includes the following steps:

In step 201, the terminal obtains, based on data of a plurality of target frames corresponding to a target time slice, a first target parameter that needs to be met by a camera in the target time slice.

In some embodiments, the target time slice refers to a time slice on which a camera operation (e.g., movement and scaling) control operation needs to be performed currently. In a process of directing a game video, the terminal divides the game video into a plurality of time slices according to a first reference time interval, and then sequentially performs a camera operation (e.g., movement and scaling) control operation in each time slice according to the method provided in this embodiment of this disclosure. In some embodiments, the first reference time interval is set according to experience or freely adjusted according to application scenarios, which is not limited in the embodiments of this disclosure. For example, the first reference time interval is set to 1 second. In this case, a time interval corresponding to the target time slice is also 1 second.

In some embodiments, the plurality of target frames corresponding to the target time slice include a game video frame corresponding to a start timestamp of the target time slice and a reference number of game video frames located before the game video frame corresponding to the start timestamp. In some embodiments, the reference number is set according to experience or freely adjusted according to application scenarios, which is not limited in the embodiments of this disclosure. In some embodiments, the reference number is set to 10. In this case, the terminal can obtain the first target parameter that needs to be met by the camera in the target time slice based on 11 target frames corresponding to the target time slice.

In some embodiments, the data of each target frame refers to original data in the frame, which includes, but is not limited to, position data of an interaction object in the target frame, timestamp data of the target frame, and the like. The interaction object in the target frame refers to a game character model participating in a game process included in the target frame.

In some embodiments, the first target parameter refers to a parameter that needs to be met by the camera at an end moment of the target time slice. The first target parameter includes at least one of a first position parameter or a first scaling parameter. The first position parameter is used for indicating a position that needs to be focused by the camera at the end moment of the target time slice, and the first scaling parameter is used for indicating a scaling value that needs to be reached by the camera at the end moment of the target time slice. In some embodiments, the terminal can represent the first position parameter in the form of position coordinates and represent the first scaling parameter in the form of a value. In some embodiments, when the terminal represents the first scaling parameter by using a value, a value between 0 and 1 (including 0 and 1) may be used to represent that a focus range of the camera is zoomed out, 1 may be used to represent that the focus range of the camera is unchanged, and a value greater than 1 may be used to represent that the focus range of the camera is zoomed in.

In this implementation, the terminal obtains the first target parameter based on the data of the plurality of target frames, so that harmful impact of abnormal data of one video frame on the first target parameter may be reduced, and the reliability of the obtained first target parameter is relatively high, thereby improving the stability of a subsequent camera operation (e.g., movement and scaling) control process.

In some embodiments, a process that the terminal obtains, based on data of a plurality of target frames corresponding to a target time slice, a first target parameter that needs to be met by a camera in the target time slice includes the following steps 2011 to 2013:

In step 2011, the terminal performs sampling processing on the data of the target frames corresponding to the target time slice, to obtain a sampling parameter corresponding to each target frame.

In some embodiments, the sampling parameter corresponding to each target frame refers to a parameter that is determined based on the target frame and needs to be met by the camera in the target time slice. The sampling parameter corresponding to each target frame includes at least one of a sampling position parameter or a sampling scaling parameter corresponding to the target frame.

In some embodiments, in a case that the sampling parameter corresponding to each target frame includes a sampling position parameter, a process that the terminal performs sampling processing on the data of the target frames corresponding to the target time slice, to obtain a sampling parameter corresponding to each target frame includes step A and step B:

In step A, the terminal obtains a center position parameter of interaction objects in each target frame based on the data of the target frames.

In some embodiments, the center position parameter of the interaction objects in each target frame is used for indicating a geometric center of a position of the interaction objects in each target frame. An implementation process of this step is that: the terminal extracts position data of the interaction objects in each target frame from the data of the target frames. The terminal obtains the center position parameter of the interaction objects in each target frame based on the position data of the interaction objects.

In some embodiments, a process that the terminal obtains the center position parameter of the interaction objects in each target frame based on the position data of the interaction objects is that: the terminal uses an average value of the position data of the interaction objects as the center position parameter of the interaction objects in each target frame. The terminal can implement the foregoing process based on Formula 1.

$$P_{i1}=\text{Sum}(P_c)/N(p) \quad \text{(Formula 1)}$$

$P_{i1}$ represents the center position parameter of the interaction objects in each target frame; $\text{Sum}(P_c)$ represents a sum of the position data of the interaction objects in each target frame; and $N(p)$ represents a quantity of interaction objects in each target frame.

In step B, the terminal determines the sampling position parameter corresponding to each target frame based on the center position parameter of the interaction objects in each target frame and an assembly position parameter of the interaction objects.

In some embodiments, the assembly position parameter of the interaction objects refers to a parameter of a final assembly point that needs to be reached by all interaction objects in the game video. The terminal can obtain the assembly position parameter from the backend server of the game client. For different target frames, the center position parameters of the interaction object may be different, but a final assembly position of the interaction object is the same, so that the assembly position parameters of the interaction objects are the same.

Figure 3:
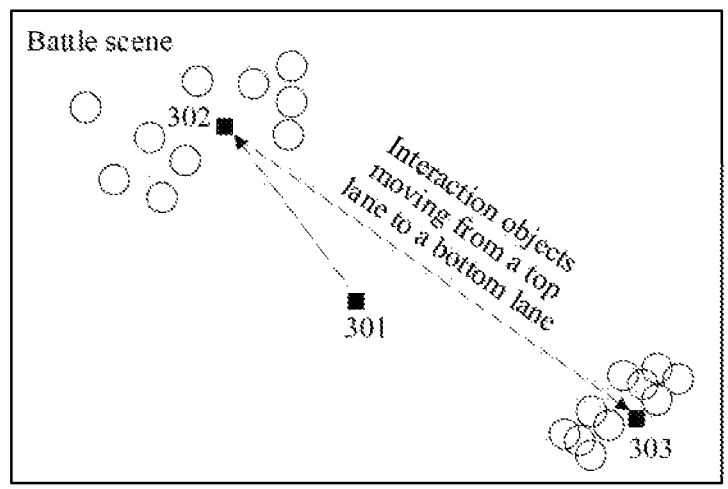
FIG. 3 is a schematic diagram of a operation (e.g., movement and scaling) process of an interaction object according to an embodiment of this disclosure.

In a battle scene of the game video, as shown in FIG. 3, a movement process of the interaction object is that: the interaction object first moves from a start position point 301 to a middle assembly point 302, then the interaction object moves from the middle assembly point 302 to a final assembly point 303 by moving from a top lane to a bottom lane. The backend server of the game client can obtain a parameter of the final assembly point by analyzing the entire game video, and feed the parameter of the final assembly point back to the terminal. Therefore, the terminal obtains the assembly position parameter of the interaction object.

In some embodiments, a process that the terminal determines the sampling position parameter corresponding to each target frame based on the center position parameter of the interaction objects in each target frame and an assembly position parameter of the interaction objects is that: the terminal determines the sampling position parameter corresponding to each target frame based on the center position parameter of the interaction objects in each target frame and a first weight value, and the assembly position parameter of the interaction objects and a second weight value. In some embodiments, the terminal respectively obtains a product of the center position parameter of the interaction objects in each target frame and the first weight value and a product of the assembly position parameter of the interaction objects and the second weight value, and uses a sum of the two products as the sampling position parameter corresponding to each target frame. The terminal can implement the foregoing process based on Formula 2.

$$P_i = P_{i1} \times d_1 + P_{i2} \times d_2 \quad \text{(Formula 2)}$$

$P_i$ represents the sampling position parameter corresponding to each target frame; $P_{i1}$ represents the center position parameter of the interaction objects in each target frame, and $d_1$ represents the first weight value; and $P_{i2}$ represents the assembly position parameter of the interaction objects, and $d_2$ represents the second weight value. In some embodiments, the first weight value and the second weight value are set according to experience or freely adjusted according to application scenarios, which is not limited in the embodiments of this disclosure. In some embodiments, when the first weight value is set to 0.5, the second weight value may be also set to 0.5. This setting manner can enable the user to both view performance of each interaction object at a current position and performance at the final assembly point.

Figure 4:
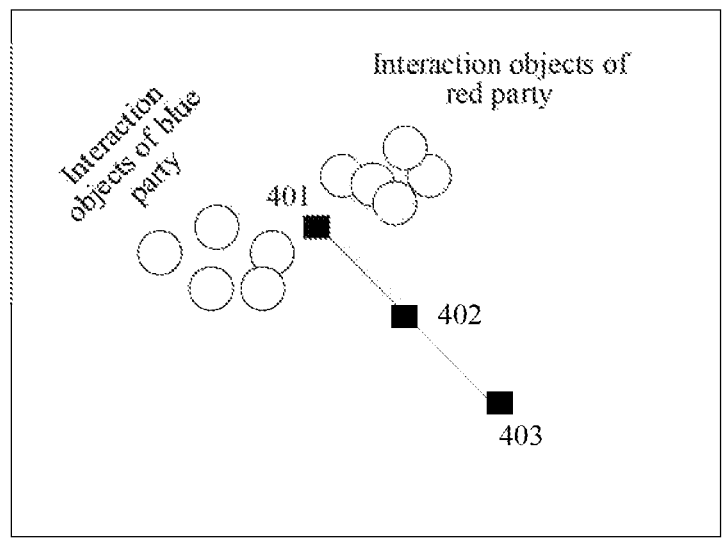
FIG. 4 is a schematic diagram of position points indicated by a center position parameter, a sampling position parameter, and an assembly position parameter according to an embodiment of this disclosure.

In some embodiments, if the terminal uses position coordinates to represent the center position parameter, the sampling position parameter, and the assembly position parameter corresponding to each target frame, the center position parameter, the sampling position parameter, and the assembly position parameter respectively indicate a position point. The position points indicated by the center position parameter, the sampling position parameter, and the assembly position parameter may be as shown in FIG. 4. In FIG. 4, a blue party and a red party are two teams rival to each other in the game video, and the terminal can determine a position point 401 indicated by a center position parameter of each interaction object of the red party and each interaction object of the blue party, a position point 403 indicated by the assembly position parameter, and a position point 402 indicated by the sampling position parameter corresponding to the target frame.

In this implementation, the terminal determines the sampling position parameter corresponding to each target frame by taking the center position parameter corresponding to each target frame and the assembly position parameter into comprehensive consideration, so that in a camera operation (e.g., movement and scaling) control process, the camera may be caused to meet the first position parameter and the first scaling parameter simultaneously, thereby reducing visual abruptness.

In some embodiments, in a case that the sampling parameter corresponding to each target frame includes a sampling scaling parameter, a process that the terminal performs sampling processing on the data of the target frames corresponding to the target time slice, to obtain a sampling parameter corresponding to each target frame includes step a to step c:

In step a, the terminal obtains a distance parameter corresponding to each target frame based on the data of the target frames.

In some embodiments, an implementation process of this step is that: the terminal respectively obtains, based on the data of the target frames, a distance between the position data of each interaction object and the sampling position parameter corresponding to each target frame and a distance between the sampling position parameter corresponding to each target frame and the assembly position parameter. The terminal uses a maximum distance of the foregoing distances as the distance parameter corresponding to each target frame. The terminal can obtain the distance parameter corresponding to each target frame by using Formula 3.

$$L=\max\{|P_c-P_i|,|P_{i2}-P_i|\} \quad \text{(Formula 3)}$$

L represents the distance parameter corresponding to each target frame; $P_c$ represents the position data of each interaction object in each target frame; $P_i$ represents the sampling position parameter corresponding to each target frame; and $P_{i2}$ represents the assembly position parameter.

In step b, the terminal determines a scaling change magnification corresponding to the distance parameter based on a distance-scaling change magnification curve.

In a process that the camera keeps moving, the distance parameter corresponding to each game video frame in the entire game video reduces from $L_{max}$ to $L_{min}$, and the scaling parameter increases from $S_{min}$ to $S_{max}$. $L_{max}$ refers to a maximum value among the distance parameter corresponding to each game video frame in the entire game video, and $L_{min}$ refer to a minimum value among the distance parameter corresponding to each game video frame in the entire game video; $S_{min}$ refers to a minimum scaling value of the camera in the entire game video and corresponds to $L_{max}$; and $S_{max}$ refers to a maximum scaling value of the camera in the entire game video and corresponds to $L_{min}$.

According to the characteristics of the game scene, in the entire game video, a value of the distance parameter corresponding to each game video frame does not linearly changes between $L_{max}$ and $L_{min}$, but is relatively concentrated on the $L_{min}$ side. Therefore, changing from $S_{min}$ to $S_{max}$ is to be as follows: a change speed in the former part is low, and a change speed in the latter part is high. Therefore, a slop of the distance-scaling change magnification curve used in this embodiment of this disclosure is an increasing tendency, that is, the slope of the distance-scaling change magnification curve is small in the former part and large in the latter part. This distance-scaling change magnification curve can increase a mapping range and optimize visual feeling of camera operation (e.g., movement and scaling) when the value of L is in a relatively concentrated range. The foregoing $L_{max}$, $L_{min}$, $S_{min}$, and $S_{max}$ may be determined by the backend server of the game client and fed back to the game client, or may be read by the game client from a configuration file recording $L_{max}$, $L_{min}$, $S_{min}$, and $S_{max}$.

Figure 5:
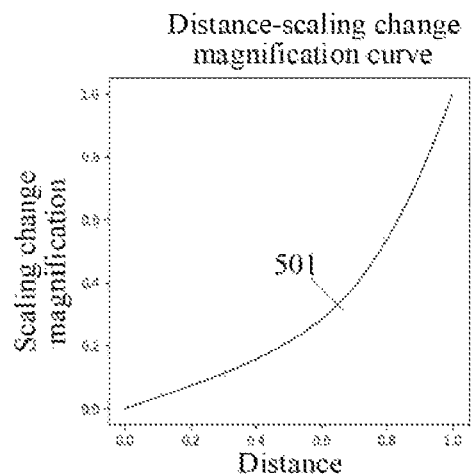
FIG. 5 is a schematic diagram of a distance-scaling change magnification curve according to an embodiment of this disclosure.

In some embodiments, the distance-scaling change magnification curve is as shown by 501 in FIG. 5. In FIG. 5, a horizontal coordinate represents a normalized distance, and a longitudinal coordinate represents a scaling change magnification. A slope of the distance-scaling change magnification curve 501 shown in FIG. 5 is an increasing tendency. As a value of the horizontal coordinate changes from 0 to 1, a value of the longitudinal also changes from 0 to 1.

In some embodiments, a process that the terminal determines a scaling change magnification corresponding to the distance parameter based on a distance-scaling change magnification curve is that: the terminal performs normalization processing on the distance parameter, to obtain a normalized distance parameter. The terminal determines a scaling change magnification corresponding to the normalized distance parameter based on the distance-scaling change magnification curve.

In some embodiments, the terminal can obtain the normalized distance parameter by using Formula 4.

$$L'=(L_{max}-L)/(L_{max}-L_{min}) \quad \text{(Formula 4)}$$

L' represents the normalized distance parameter; L represents the distance parameter before the normalization processing, and $L_{max}$ represents the maximum value among the distance parameter corresponding to each game video frame in the entire game video; and $L_{min}$ represents the minimum value among the distance parameter corresponding to each game video frame in the entire game video.

In step c, the terminal determines the sampling scaling parameter corresponding to each target frame based on the scaling change magnification.

In some embodiments, the terminal can determine the sampling scaling parameter corresponding to each target frame by using Formula 5.

$$S_i=(S_{max}-S_{min})\times r+S_{min} \quad \text{(Formula 5)}$$

$S_i$ represents the sampling scaling parameter corresponding to each target frame; r represents the scaling change magnification; $S_{min}$ represents the minimum scaling value of the camera in the entire game video; and $S_{max}$ represents the maximum scaling value of the camera in the entire game video.

In a word, for a case that the sampling parameter corresponding to each target frame only includes the sampling position parameter, the terminal may obtain the sampling parameter corresponding to each target frame according to the foregoing step A and step B. For a case that the sampling parameter corresponding to each target frame only includes the sampling scaling parameter, the terminal may obtain the sampling parameter corresponding to each target frame according to the foregoing step a to step c. For a case that the sampling parameter corresponding to each target frame includes the sampling position parameter and the sampling scaling parameter, the terminal may obtain the sampling parameter corresponding to each target frame according to the foregoing step A and step B and step a to step c.

In some embodiments, the terminal performs sampling processing on the data of each target frame respectively based on step 2011, to obtain the sampling parameter corresponding to each target frame, and then performs step 2012.

In step 2012, the terminal sets a weight value for each target frame according to a distance between a timestamp and a start timestamp of the target time slice.

In some embodiments, a process that the terminal sets a weight value for each target frame according to a distance between a timestamp and a start timestamp of the target time slice is that: the terminal sets weight values from small to large for each target frame according to a from far to near sequence of the distance between the timestamp and the start timestamp of the target time slice, or the terminal sets weight values from large to small for each target frame according to a from near to far sequence of the distance between the timestamp and the start timestamp of the target time slice. In some embodiments, distribution of the weight values corresponding to each target frame meet Gaussian distribution.

In some embodiments, if the quantity of the target frames is 5, the terminal sets weight values of 1/55, 4/55, 9/55, 16/55, and 25/55 for each target frame respectively according to a from far to near sequence of the distance between the timestamp and the start timestamp of the target time slice.

In step 2013, the terminal determines the first target parameter that needs to be met by the camera in the target time slice based on the sampling parameter corresponding to each target frame and the weight value corresponding to each target frame.

In some embodiments, a process that the terminal determines the first target parameter that needs to be met by the camera in the target time slice based on the sampling parameter corresponding to each target frame and the weight value corresponding to each target frame is that: the terminal obtains a product of the sampling parameter corresponding to each target frame and the weight value corresponding to each target frame respectively, and then uses a sum of the products as the first target parameter that needs to be met by the camera in the target time slice.

For a case that the sampling parameter corresponding to each target frame includes the sampling position parameter, the first target parameter includes the first position parameter. For a case that the sampling parameter corresponding to each target frame includes the sampling scaling parameter, the first target parameter includes the first scaling parameter. For a case that the sampling parameter corresponding to each target frame includes the sampling position parameter and the sampling scaling parameter, the first target parameter includes the first position parameter and the first scaling parameter.

In some embodiments, if the quantity of the target frames is 5, the terminal sets weight values of 1/55, 4/55, 9/55, 16/55, and 25/55 for each target frame respectively according to a from far to near sequence of the distance between the timestamp and the start timestamp of the target time slice. The terminal can obtain the first position parameter in the first target parameter by using Formula 6.

$$P_n = P_1 \times 1/55 + P_2 \times 4/55 + P_3 \times 9/55 + P_4 \times 16/55 + P_5 \times 25/55 \quad \text{(Formula 6)}$$

$P_n$ represents the first position parameter in the first target parameter; and $P_1$, $P_2$, $P_3$, $P_4$ and $P_5$ respectively represent sampling position parameters corresponding to 5 target frames arranged in a from far to near sequence of the distance between the timestamp and the start timestamp of the target time slice.

In some embodiments, the terminal can obtain the first scaling parameter in the first target parameter by using Formula 7.

$$S_n = S_1 \times 1/55 + S_2 \times 4/55 + S_3 \times 9/55 + S_4 \times 16/55 + S_5 \times 25/55 \quad \text{(Formula 7)}$$

$S_n$ represents the first scaling parameter in the first target parameter; and $S_1$, $S_2$, $S_3$, $S_4$ and $S_5$ respectively represent sampling scaling parameters corresponding to 5 target frames arranged in a from far to near sequence of the distance between the timestamp and the start timestamp of the target time slice.

In some embodiments, after the first target parameter that needs to be met by the camera in the target time slice is obtained, the terminal may further perform validity verification on the first target parameter based on a parameter change threshold.

In some embodiments, a process that the terminal performs validity verification on the first target parameter based on a parameter change threshold is: obtaining a change parameter of the camera in the target time slice; and performing validity verification on the first target parameter based on a comparison result of the change parameter and the parameter change threshold.

In some embodiments, a process that the terminal obtains a change parameter of the camera in the target time slice is that: the terminal obtains the change parameter of the camera in the target time slice based on a second target parameter that has been met by the camera in the target time slice and the first target parameter. The second target parameter that has been met in the target time slice refers to a parameter that is met by the camera at a start moment of the target time slice, and the second target parameter includes at least one of a second position parameter or a second scaling parameter.

When the first target parameter includes the first position parameter, the change parameter of the camera in the target time slice includes a position change parameter, and the terminal can represent the position change parameter by using a distance between the first position parameter and the second position parameter. When the first target parameter includes the first scaling parameter, the change parameter of the camera in the target time slice includes a scaling change parameter, and the terminal can represent the scaling change parameter by using an absolute value of a difference between the first scaling parameter and the second scaling parameter.

In some embodiments, a process that the terminal performs validity verification on the first target parameter based on a comparison result of the change parameter and the parameter change threshold is that: when the change parameter is lower than the parameter change threshold, the terminal determines that the validity verification on the first target parameter fails; and when the change parameter is not lower than the parameter change threshold, the terminal determines that the validity verification on the first target parameter succeeds.

In some embodiments, for a case that the first target parameter includes the first position parameter and the first scaling parameter, the change parameter of the camera in the target time slice includes a position change parameter and a scaling change parameter. In this case, a process that the terminal performs validity verification on the first target parameter based on a comparison result of the change parameter and the parameter change threshold is that: the terminal performs validity verification on the first position parameter based on a comparison result of the position change parameter and a first parameter change threshold; and the terminal performs validity verification on the first scaling parameter based on a comparison result of the scaling change parameter and a second parameter change threshold. The first parameter change threshold and the second parameter change threshold may be the same or may be different, which is not limited in the embodiments of this disclosure. Through the foregoing process, the terminal can discard a parameter on which validity verification fails, uses the remaining parameter as the first target parameter on which validity verification succeeds, and the terminal performs step 202 based on the first target parameter on which validity verification succeeds.

In some embodiments, if the first target parameter includes the first position parameter and the first scaling parameter, the second target parameter includes a second position parameter and a second scaling parameter, and the change parameter of the camera in the target time slice includes a position change parameter and a scaling change parameter. It is assumed that position coordinates of the first position parameter are (1, 1), position coordinates of the second position parameter are (0, 1), the first scaling parameter is 10, and the second scaling parameter is 2, the terminal may represent the position change parameter of the camera in the target time slice by using a Euclidean distance 1 between the two position coordinates, and present the scaling change parameter of the camera in the target time slice by using an absolute value 8 of a difference between the two scaling parameters. It is assumed that the first parameter change threshold is set to 2, and the second parameter change threshold is set to 3, the validity verification on the first position parameter fails, and the validity verification on the first scaling parameter succeeds. In this case, the first target parameter on which validity verification succeeds only includes the first scaling parameter.

In this implementation, the terminal can significantly reduce a camera jitter caused by tiny translation and tiny scaling by performing validity verification on the first target parameter.

Before the terminal obtains the first target parameter that needs to be met by the camera in the target time slice, a trigger frequency may be set, and the step of obtaining the first target parameter may be triggered to be executed according to the trigger frequency. The trigger frequency may be set according to experience or freely adjusted according to application scenarios, which is not limited in the embodiments of this disclosure. A trigger moment determined according to the trigger frequency may be a moment corresponding to a short time period before each time slice, for example, a moment corresponding to 0.2 seconds before each time slice, to ensure that a camera operation (e.g., movement and scaling) control operation can be performed in time when the target time slice is reached.

In step 202, the terminal determines a target operation (e.g., movement and scaling) speed of the camera in the target time slice based on the first target parameter, an initial operation (e.g., movement and scaling) speed of the camera in the target time slice, a time interval corresponding to the target time slice, and a time-speed change magnification curve.

The target operation (e.g., movement and scaling) speed includes at least one of a target translation speed or a target scaling speed.

In some embodiments, the initial operation (e.g., movement and scaling) speed of the camera in the target time slice refers to a operation (e.g., movement and scaling) speed of the camera at a start moment of the target time slice, and the initial operation (e.g., movement and scaling) speed includes at least one of an initial translation speed or an initial scaling speed. The initial operation (e.g., movement and scaling) speed of the camera in the target time slice is also an operation (e.g., movement and scaling) speed of the camera at an end moment of a previous time slice of the target time slice. When a process that the terminal controls the camera to move in the previous time slice of the target time slice, the initial operation (e.g., movement and scaling) speed of the camera in the target time slice may be obtained.

In some embodiments, the time interval corresponding to the target time slice refers to a duration from the start timestamp to an end timestamp of the target time slice. The target operation (e.g., movement and scaling) speed of the camera in the target time slice refers to a operation (e.g., movement and scaling) speed of the camera at an end moment of the target time slice. That is, the target operation (e.g., movement and scaling) speed refers to a operation (e.g., movement and scaling) speed when the camera meets the first target parameter.

In some embodiments, the time-speed change magnification curve is set by a game developer or freely adjusted according to application scenarios, which is not limited in the embodiments of this disclosure. In some embodiments, the time-speed change magnification curve is a Bezier curve. The Bezier curve is a smooth curve, and setting the time-speed change curve as a Bezier curve helps improve the smoothness and stability during a camera operation (e.g., movement and scaling) process.

Figure 6:
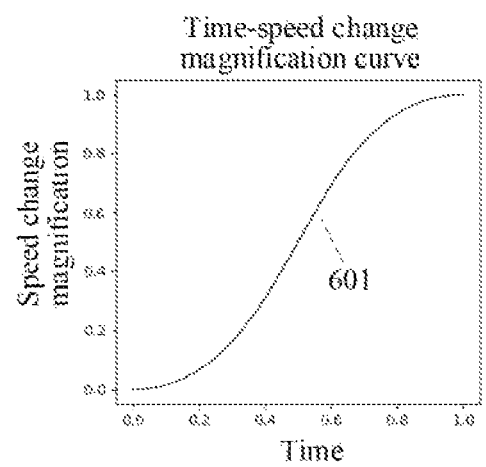
FIG. 6 is a schematic diagram of a time-speed change magnification curve according to an embodiment of this disclosure.

In some embodiments, the time-speed change magnification curve is as shown by 601 in FIG. 6. In FIG. 6, a horizontal coordinate represents a normalized time, and a longitudinal coordinate represents a speed change magnification. The time-speed change magnification curve 601 shown in FIG. 6 is a Bezier curve. As a value of the horizontal coordinate changes from 0 to 1, a value of the longitudinal also changes from 0 to 1.

In some embodiments, for a case that the terminal performs validity verification on the first target parameter, in this step, the terminal determines the target operation (e.g., movement and scaling) speed of the camera in the target time slice based on the first target parameter on which validity verification succeeds, the initial operation (e.g., movement and scaling) speed of the camera in the target time slice, the time interval corresponding to the target time slice, and the time-speed change magnification curve.

In some embodiments, a process that the terminal determines a target operation (e.g., movement and scaling) speed of the camera in the target time slice based on the first target parameter, an initial operation (e.g., movement and scaling) speed of the camera in the target time slice, a time interval corresponding to the target time slice, and a time-speed change magnification curve includes step 2021 to step 2023:

In step 2021, the terminal obtains a change parameter of the camera in the target time slice based on a second target parameter that has been met by the camera in the target time slice and the first target parameter.

In some embodiments, the second target parameter that has been met by the camera in the target time slice refers to a parameter that is met by the camera at a start moment of the target time slice, and the second target parameter includes at least one of a second position parameter or a second scaling parameter. When a camera operation (e.g., movement and scaling) control process in a previous time slice of the target time slice is ended, the second target parameter that has been met by the camera in the target time slice may be obtained.

In some embodiments, when the first target parameter includes the first position parameter, the change parameter of the camera in the target time slice includes a position change parameter, and the position change parameter may be represented by using a distance between the first position parameter and the second position parameter; and when the first target parameter includes the first scaling parameter, the change parameter of the camera in the target time slice includes a scaling change parameter, and the scaling change parameter may be presented by using an absolute value of a difference between the first scaling parameter and the second scaling parameter.

In some embodiments, it is assumed that position coordinates of the first position parameter are (1, 1), position coordinates of the second position parameter are (0, 1), the first scaling parameter is 10, and the second scaling parameter is 2, the terminal may represent the position change parameter of the camera in the target time slice by using a Euclidean distance 1 between the two position coordinates, and present the scaling change parameter of the camera in the target time slice by using an absolute value 8 of a difference between the two scaling parameters.

In step 2022, the terminal obtains a point value corresponding to the time-speed change magnification curve.

A point value about time of the time-speed change magnification curve is calculated. In some embodiments, as shown in FIG. 6, for a case that the time in the time-speed change magnification curve is normalized, a time range corresponding to the time-speed change magnification curve is [0, 1]. $\Delta V(t)$ is used to represent the time-speed change magnification curve, and the point value corresponding to the time-speed change magnification curve is obtained according to $\int_0^1 \Delta V(t)dt$ through calculation.

In step 2023, the terminal determines the target operation (e.g., movement and scaling) speed of the camera in the target time slice based on the change parameter, the initial operation (e.g., movement and scaling) speed, the time interval corresponding to the target time slice, and the point value corresponding to the time-speed change magnification curve.

In some embodiments, the terminal can determine the target operation (e.g., movement and scaling) speed of the camera in the target time slice according to Formula 8.

$$\Delta M = [V_1 \times \Delta t + (V_2 - V_1) \times \Delta t \times \int_0^1 \Delta V(t)dt] \quad \text{(Formula 8)}$$

$\Delta M$ represents the change parameter, which may be a translation change parameter or may be a scaling change parameter; $V_1$ represents a relatively small operation (e.g., movement and scaling) speed of the initial operation (e.g., movement and scaling) speed and the target operation (e.g., movement and scaling) speed, which may be a relatively small translation speed of the initial translation speed and the target translation speed, or may be a relatively small scaling speed of the initial scaling speed and the target scaling speed; $V_2$ represents a relatively large operation (e.g., movement and scaling) speed of the initial operation (e.g., movement and scaling) speed and the target operation (e.g., movement and scaling) speed, which may be a relatively large translation speed of the initial translation speed and the target translation speed, or may be a relatively large scaling speed of the initial scaling speed and the target scaling speed; $\Delta t$ represents the time interval corresponding to the target time slice; and $\int_0^1 \Delta V(t)dt$ represents the point value corresponding to the time-speed change magnification curve.

In some embodiments, when a product of the initial operation (e.g., movement and scaling) speed and the time interval is not less than the change parameter, it indicates that the initial operation (e.g., movement and scaling) speed needs to be reduced or kept unchanged, that is, the initial operation (e.g., movement and scaling) speed is not less than the target operation (e.g., movement and scaling) speed. In this case, $V_1$ represents the target operation (e.g., movement and scaling) speed, and $V_2$ represents the initial operation (e.g., movement and scaling) speed. $V_1$ is calculated according to Formula 8, so that the target operation (e.g., movement and scaling) speed may be obtained.

In some embodiments, when the product of the initial operation (e.g., movement and scaling) speed and the time interval is less than the change parameter, it indicates that the initial operation (e.g., movement and scaling) speed needs to be increased, that is, the initial operation (e.g., movement and scaling) speed is less than the target operation (e.g., movement and scaling) speed. In this case, $V_1$ represents the initial operation (e.g., movement and scaling) speed, and $V_2$ represents the target operation (e.g., movement and scaling) speed. $V_2$ is calculated according to Formula 8, so that the target operation (e.g., movement and scaling) speed may be obtained.

In some embodiments, in a case that the target operation (e.g., movement and scaling) speed includes the target translation speed and the target scaling speed, a process that the terminal determines a target operation (e.g., movement and scaling) speed of the camera in the target time slice includes that: the terminal determines, according to Formula 8, the target translation speed of the camera in the target time slice based on the translation change parameter, the initial translation speed, the time interval corresponding to the target time slice, and a point value corresponding to a time-translation speed change magnification curve; and the terminal determines, according to Formula 8, the target scaling speed of the camera in the target time slice based on the scaling change parameter, the initial scaling speed, the time interval corresponding to the target time slice, and a point value corresponding to a time-scaling speed change magnification curve. The time-translation speed change magnification curve and the time-scaling speed change magnification curve may be the same curve or may be two different curves, which is not limited in the embodiments of this disclosure.

In some embodiments, the terminal can increase impact of a steering mixed coefficient in a process of determining the target operation (e.g., movement and scaling) speed of the camera in the target time slice, to reduce discomfort brought by direction changes (a translation direction and a scaling direction), thereby improving the stability of camera operation (e.g., movement and scaling). This process may include the following step 1 to step 4:

In step 1, the terminal obtains a steering angle corresponding to the target time slice based on a first operation (e.g., movement and scaling) direction and a second operation (e.g., movement and scaling) direction.

In some embodiments, the first operation (e.g., movement and scaling) direction refers to a operation (e.g., movement and scaling) direction of the camera at the start moment of the target time slice, and the first operation (e.g., movement and scaling) direction includes at least one of a first translation direction or a first scaling direction. The second operation (e.g., movement and scaling) direction refers to a operation (e.g., movement and scaling) direction of the camera at the end moment of the target time slice, and the second operation (e.g., movement and scaling) direction includes at least one of a second translation direction or a second scaling direction. The steering angle corresponding to the target time slice includes at least one of a translation steering angle or a scaling steering angle.

In some embodiments, when the steering angle corresponding to the target time slice includes the translation steering angle, a process that the terminal obtains a steering angle corresponding to the target time slice includes: the terminal determines the translation steering angle corresponding to the target time slice based on an angle between the second translation direction and the first translation direction. That is, the terminal uses a degree corresponding to the angle between the second translation direction and the first translation direction as the translation steering angle corresponding to the target time slice. In some embodiments, the first translation direction is determined according to a position parameter at a start moment and a position parameter at an end moment of a previous time slice of the target time slice, and the second translation direction is determined according to the second position parameter in the second target parameter and the first position parameter in the first target parameter.

In some embodiments, when the steering angle corresponding to the target time slice includes the scaling steering angle, a process that the terminal obtains a steering angle corresponding to the target time slice includes: the terminal determines the scaling steering angle corresponding to the target time slice based on a comparison result of the second scaling direction and the first scaling direction. In some embodiments, the first scaling direction is determined according to a scaling parameter at a start moment and a scaling parameter at an end moment of a previous time slice of the target time slice, and the second scaling direction is determined according to the second scaling parameter in the second target parameter and the first scaling parameter in the first target parameter.

In some embodiments, a process that the terminal determines the scaling steering angle corresponding to the target time slice based on a comparison result of the second scaling direction and the first scaling direction is that: when the second scaling direction and the first scaling direction are consistent, the terminal uses a first angle as the scaling steering angle corresponding to the target time slice; and when the second scaling direction and the first scaling direction are inconsistent, the terminal uses a second angle as the scaling steering angle. The first angle and the second angle may be set according to experience. In some embodiments, the first angle is set to 0 degree, and the second angle is set to 180 degrees. The scaling direction includes a zooming in direction and a zooming out direction, and a case that the second scaling direction and the first scaling direction are consistent refers to that both the second scaling direction and the first scaling direction are a zooming in direction, or both the second scaling direction and the first scaling direction are a zooming out direction.

In step 2, the terminal determines a steering mixed coefficient corresponding to the steering angle.

In some embodiments, a manner in which the terminal determines the steering mixed coefficient corresponding to the steering angle includes, but is not limited to, the following two types:

Manner 1: The terminal determines the steering mixed coefficient corresponding to the steering angle based on an angle-steering mixed coefficient curve.

Figure 7:
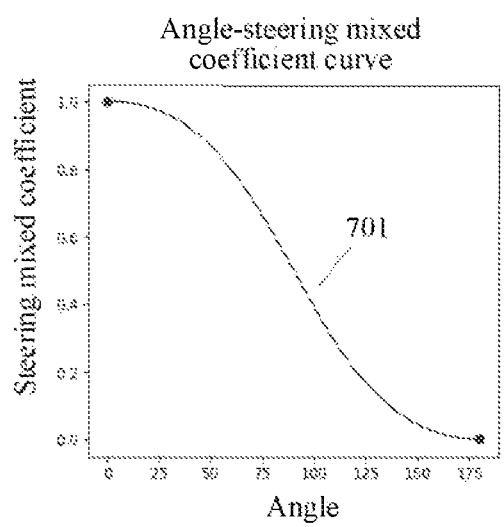
FIG. 7 is a schematic diagram of an angle-steering mixed coefficient curve according to an embodiment of this disclosure.

In some embodiments, the angle-steering mixed coefficient curve is as shown by 701 in FIG. 7. In FIG. 7, a horizontal coordinate represents an angle, and a longitudinal coordinate represents a steering mixed coefficient. After the steering angle is determined, the terminal can determine the steering mixed coefficient corresponding to the steering angle according to the angle-steering mixed coefficient curve 701. As the angle changes from 0 degree to 180 degrees, the steering mixed coefficient decreases from 1 to 0.

Manner 2: The terminal determines the steering mixed coefficient corresponding to the steering angle based on a correspondence between angles and steering mixed coefficients.

In some embodiments, the correspondence between angles and steering mixed coefficients is set by a game developer, which is not limited in the embodiments of this disclosure. In some embodiments, the correspondence between angles and steering mixed coefficients is represented in the form of a table. After the steering angle is determined, the terminal can query the steering mixed coefficient corresponding to the steering angle in a correspondence table of angles and steering mixed coefficients.

For a case that the steering angle includes the translation steering angle and the scaling steering angle, the terminal needs to respectively determine a translation steering mixed coefficient corresponding to the translation steering angle and a scaling steering mixed coefficient corresponding to the scaling steering angle according to the foregoing manner 1 or manner 2.

In step 3, the terminal updates the initial operation (e.g., movement and scaling) speed based on the steering mixed coefficient, to obtain an updated initial operation (e.g., movement and scaling) speed.

In some embodiments, a manner in which the terminal updates the initial operation (e.g., movement and scaling) speed based on the steering mixed coefficient is that: the terminal uses a product of the initial operation (e.g., movement and scaling) speed before update and the steering mixed coefficient as the updated initial operation (e.g., movement and scaling) speed.

In step 4, the terminal determines the target operation (e.g., movement and scaling) speed of the camera in the target time slice based on the first target parameter, the updated initial operation (e.g., movement and scaling) speed, the time interval corresponding to the target time slice, and the time-speed change magnification curve.

For an implementation process of step 4, reference may be made to step 2021 to step 2023, and details are not described herein again.

In some embodiments, after the target operation (e.g., movement and scaling) speed is obtained, the terminal can update the target operation (e.g., movement and scaling) speed based on a correction coefficient, to obtain an updated target operation (e.g., movement and scaling) speed. The terminal can implement the foregoing process based on Formula 9:

$$V_2(n)=V_1(n)\times R \quad \text{(Formula 9)}$$

$V_2(n)$ represents the updated target operation (e.g., movement and scaling) speed, $V_1(n)$ represents the target operation (e.g., movement and scaling) speed before update, and R represents the correction coefficient. The correction coefficient may be set according to experience or freely adjusted according to application scenarios, which is not limited in the embodiments of this disclosure. For example, the correction coefficient is set to be within a range of [0.9, 1], for example, R=0.95. Updating the target operation (e.g., movement and scaling) speed based on the correction coefficient within this range may reduce errors caused by integral calculation on one hand, and may further cause the camera to tend to meet the first target parameter in a delayed manner on the other hand. Compared with meeting the first target parameter in advance, meeting the first target parameter in a delayed manner can improve a visual effect and reduce a sense of pause.

In some embodiments, for a case that the target operation (e.g., movement and scaling) speed includes the target translation speed and the target scaling speed, the terminal can update the target translation speed based on a first correction coefficient to obtain an updated target translation speed; and the terminal updates the target scaling speed based on a second correction coefficient to obtain an updated target scaling speed. The first correction coefficient and the second correction coefficient may be the same or may be different, which is not limited in the embodiments of this disclosure.

In step 203, the terminal controls the camera to move based on the time-speed change magnification curve, the initial operation (e.g., movement and scaling) speed, and the target operation (e.g., movement and scaling) speed, to meet the first target parameter.

In a case that the target operation (e.g., movement and scaling) speed is updated based on the correction coefficient, the target operation (e.g., movement and scaling) speed in this step refers to the updated target operation (e.g., movement and scaling) speed. In a case that the initial operation (e.g., movement and scaling) speed is updated based on the steering mixed coefficient, the initial operation (e.g., movement and scaling) speed in this step refers to the updated initial operation (e.g., movement and scaling) speed.

In some embodiments, a process that the terminal controls the camera to move based on the time-speed change magnification curve, the initial operation (e.g., movement and scaling) speed, and the target operation (e.g., movement and scaling) speed includes step 2031 to step 2034:

In step 2031, the terminal divides a process of controlling the camera to move into a reference number of subprocesses.

In some embodiments, in the time interval corresponding to the target time slice, the terminal can divide, according to a second reference time interval, the process of controlling the camera to move into a reference number of consecutive subprocesses, to cause the camera to meet the first target parameter by controlling the camera to move step by step. The reference number may be determined according to the time interval corresponding to the target time slice and the second reference time interval. In some embodiments, the terminal uses a ratio of the time interval corresponding to the target time slice to the second reference time interval as the reference number.

In some embodiments, the second reference time interval is determined according to the time interval corresponding to the target time slice or is set according to experience, which is not limited in the embodiments of this disclosure. In some embodiments, when the time interval corresponding to the target time slice is 1 second, the second reference time interval is set to 0.02 seconds. In this case, the reference number is 50. A time interval corresponding to each subprocess obtained by the terminal according to this division manner is 0.02 seconds.

In some embodiments, after the process of dividing the camera operation (e.g., movement and scaling) process into a reference number of subprocesses, the terminal can further obtain a sub-operation (e.g., movement and scaling) speed corresponding to each subprocess based on step 2032 and step 2033.

In step 2032, the terminal determines a speed change magnification corresponding to any subprocess based on a time parameter corresponding to the any subprocess and the time-speed change magnification curve.

In some embodiments, the time in the time-speed change magnification curve is normalized, and a time range corresponding to the time-speed change magnification curve is [0, 1]. Before the speed change magnification corresponding to the any subprocess is determined, the time parameter corresponding to the any subprocess needs to be obtained first. In some embodiments, a process that the terminal obtains the time parameter corresponding to the any subprocess includes the two following steps:

In step 1, the terminal uses a ratio of a target time interval to the time interval corresponding to the target time slice as a target ratio.

The target time interval refers to a sum of time intervals corresponding to subprocesses located before the any subprocess in the target time slice. For example, it is assumed that the time interval corresponding to the target time slice is 1 second, the time interval corresponding to each subprocess is 0.02 seconds, and the any subprocess is a sixth subprocess in the target time slice. In this case, the target time interval refers to a sum of time intervals corresponding to 5 subprocesses located before the any subprocess in the target time slice, and the target time slice is 0.1 seconds. In this case, the target ratio is 0.1/1=0.1.

In step 2, when the initial operation (e.g., movement and scaling) speed is less than the target operation (e.g., movement and scaling) speed, the terminal uses the target ratio as the time parameter corresponding to the any subprocess; and when the initial operation (e.g., movement and scaling) speed is not less than the target operation (e.g., movement and scaling) speed, the terminal uses a difference between 1 and the target ratio as the time parameter corresponding to the any subprocess.

After the time parameter corresponding to the any subprocess is determined based on step 1 and step 2, the terminal can determine a speed change magnification corresponding to the time parameter based on the time-speed change magnification curve, and uses the speed change magnification as the speed change magnification corresponding to the any subprocess.

The speed change magnification includes at least one of a translation speed change magnification or a scaling speed change magnification. In a process that the terminal obtains a translation speed change magnification corresponding to the any subprocess, the terminal determines a translation speed change magnification corresponding to the time parameter based on a time-translation speed change magnification curve, and uses the translation speed change magnification as the translation speed change magnification corresponding to the any subprocess; and in a process that the terminal obtains a scaling speed change magnification corresponding to the any subprocess, the terminal determines a scaling speed change magnification corresponding to the time parameter based on a time-scaling speed change magnification curve, and uses the scaling speed change magnification as the scaling speed change magnification corresponding to the any subprocess.

In step 2033, the terminal determines a sub-operation (e.g., movement and scaling) speed corresponding to the any subprocess based on the initial operation (e.g., movement and scaling) speed, the target operation (e.g., movement and scaling) speed, and the speed change magnification corresponding to the any subprocess.

In some embodiments, the terminal can obtain the sub-operation (e.g., movement and scaling) speed corresponding to the any subprocess based on Formula 10:

$$V_c = V_1 + (V_2 - V_1) \times \Delta V(T) \qquad \text{(Formula 10)}$$

$V_c$ represents the sub-operation (e.g., movement and scaling) speed corresponding to the any subprocess, and $V_1$ represents a relatively small operation (e.g., movement and scaling) speed of the initial operation (e.g., movement and scaling) speed and the target operation (e.g., movement and scaling) speed; $V_2$ represents a relatively large operation (e.g., movement and scaling) speed of the initial operation (e.g., movement and scaling) speed and the target operation (e.g., movement and scaling) speed; T represents the time parameter corresponding to the any subprocess determined in step 2032; and ΔV(T) represents the speed change magnification corresponding to the any subprocess.

In some embodiments, the sub-operation (e.g., movement and scaling) speed includes at least one of a sub-translation speed or a sub-scaling speed. In a process that the terminal calculates the sub-translation speed based on Formula 10, $V_c$ represents the sub-translation speed corresponding to the any subprocess, and $V_1$ represents a relatively small translation speed of the initial translation speed and the target translation speed; $V_2$ represents a relatively large translation speed of the initial translation speed and the target translation speed; and ΔV(T) represents the translation speed change magnification corresponding to the any subprocess determined based on the time-translation speed change magnification curve.

In some embodiments, in a process that the terminal calculates the sub-scaling speed based on Formula 10, $V_c$ represents the sub-scaling speed corresponding to the any subprocess, and $V_1$ represents a relatively small scaling speed of the initial scaling speed and the target scaling speed; $V_2$ represents a relatively large scaling speed of the initial scaling speed and the target scaling speed; and ΔV(T) represents the scaling speed change magnification corresponding to the any subprocess determined based on the time-scaling speed change magnification curve.

In step 2034, the terminal controls the camera to move according to the sub-operation (e.g., movement and scaling) speed corresponding to the any subprocess in a time interval corresponding to the any subprocess.

In the time interval corresponding to the any subprocess, the operation (e.g., movement and scaling) speed of the camera keeps the sub-operation (e.g., movement and scaling) speed corresponding to the any subprocess unchanged. In some embodiments, the time interval corresponding to the any subprocess is 0.02 seconds, and the sub-operation (e.g., movement and scaling) speed corresponding to the any subprocess includes a sub-translation speed and a sub-scaling speed, where the sub-translation speed is 1 meter per second, and the sub-scaling speed is 0.5 per second. In the 0.02 seconds corresponding to the any subprocess, the camera is controlled to perform scaling at a speed of 0.5 per second while the camera is controlled to perform translation at a speed of 1 meter per second.

In some embodiments, after the sub-operation (e.g., movement and scaling) speed corresponding to the any subprocess is determined, the terminal may continue to determine a sub-operation (e.g., movement and scaling) speed of a next subprocess, to control the camera to move according to the sub-operation (e.g., movement and scaling) speed corresponding to the next subprocess after controlling the camera to move according to the sub-operation (e.g., movement and scaling) speed corresponding to the any subprocess, and the rest may be deduced by analogy until a sub-operation (e.g., movement and scaling) speed corresponding to the last subprocess in the target time slice is determined. The terminal then controls the camera to move according to the sub-operation (e.g., movement and scaling) speed corresponding to the last subprocess, to cause the camera to meet the first target parameter, so as to complete the camera operation (e.g., movement and scaling) control process in the target time slice. The terminal then continues to perform a camera operation (e.g., movement and scaling) control operation in a next time slice based on the foregoing step 201 to step 203.

Figure 8:
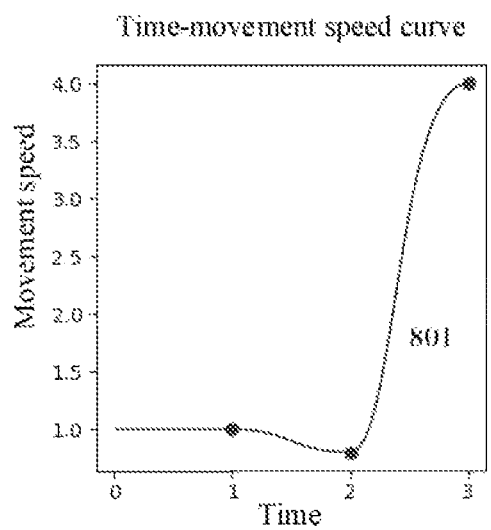
FIG. 8 is a schematic diagram of a time-movement speed curve according to an embodiment of this disclosure.

In the entire process of controlling a camera to move according to the method provided in this embodiment of this disclosure, the operation (e.g., movement and scaling) continuity of the camera between adjacent time slices is relatively good, and a transition of the camera between adjacent time slices may be smooth, thereby achieving smooth operation (e.g., movement and scaling) and reducing discomfort of the user. For example, it is assumed that the time interval of each time slice is 1 second, a time-operation (e.g., movement and scaling) speed curve of camera operation (e.g., movement and scaling) among 3 adjacent time slices may be as shown by 801 in FIG. 8, and the curve 801 in FIG. 8 has good continuity at each junction, which indicates that the smoothness of the camera operation (e.g., movement and scaling) process is relatively good.

Figure 9:
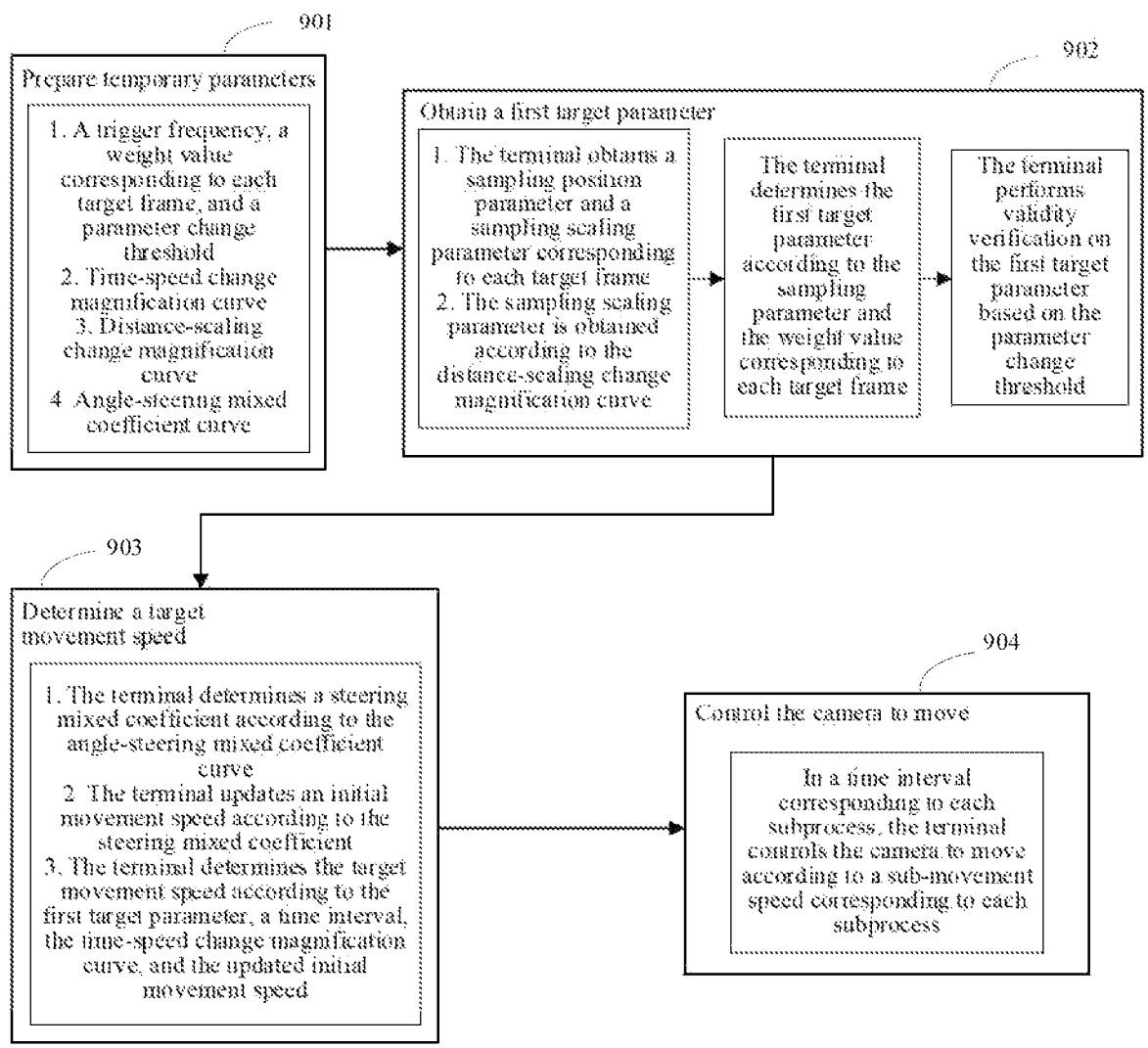
FIG. 9 is a schematic diagram of a camera operation (e.g., movement and scaling) control process according to an embodiment of this disclosure.

Based on the above, a process that the terminal controls the camera to move may be as shown by 901 to 904 in FIG. 9:

In 901, temporary parameters are prepared. After a first target parameter is obtained, temporary parameters for usage in subsequent processes are prepared, which include, but are not limited to, a trigger frequency, a weight value of each target frame, a parameter change threshold, a time-speed change magnification curve, a distance-scaling change magnification curve, and an angle-steering mixed coefficient curve.

In 902, a first target parameter is obtained. The terminal obtains a sampling position parameter and a sampling scaling parameter corresponding to each target frame, where the sampling scaling parameter is determined according to the distance-scaling change magnification curve. The terminal determines the first target parameter according to the sampling parameter and the weight value corresponding to each target frame. the terminal performs validity verification on the first target parameter according to the parameter change threshold, to achieve an effect of filtering the first target parameter.

In 903, the terminal determines a target operation (e.g., movement and scaling) speed. The terminal determines a steering mixed coefficient according to the angle-steering mixed coefficient curve. The terminal updates an initial operation (e.g., movement and scaling) speed according to the steering mixed coefficient. The terminal determines the target operation (e.g., movement and scaling) speed according to the first target parameter, a time interval, the time-speed change magnification curve, and the updated initial operation (e.g., movement and scaling) speed.

In 904, the terminal controls the camera to move. The terminal determines a sub-operation (e.g., movement and scaling) speed corresponding to each subprocess according to the target operation (e.g., movement and scaling) speed, the updated initial operation (e.g., movement and scaling) speed, and the time-speed change magnification curve. In a time interval corresponding to each subprocess, the terminal controls the camera to move according to the sub-operation (e.g., movement and scaling) speed corresponding to each subprocess, to cause the camera to meet the first target parameter.

In the embodiments of this disclosure, the terminal obtains the first target parameter that needs to be met by the camera in the target time slice based on the data of the plurality of target frames, so that the reliability of the first target parameter is relatively high, which helps improve the stability of camera operation (e.g., movement and scaling). In addition, the camera operation (e.g., movement and scaling) is controlled based on a time-speed change magnification curve, which helps improve the operation (e.g., movement and scaling) continuity of the camera between adjacent time slices, so that the stability of the operation (e.g., movement and scaling) process of the camera is relatively high, and the camera operation (e.g., movement and scaling) control effect is relatively good.

It is noted that the process for camera control in FIG. 9 can be implemented in any suitable electronic device, such as a terminal (device), a server (device), and the like.

Figure 10:
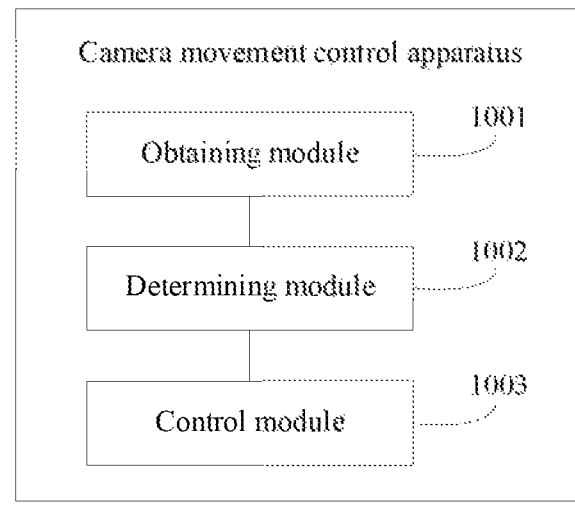
FIG. 10 is a schematic diagram of a camera operation (e.g., movement and scaling) control apparatus according to an embodiment of this disclosure.

Referring to FIG. 10, an embodiment of this disclosure provides a camera operation (e.g., movement and scaling) control apparatus that includes an obtaining module 100, a determining module 1002, and a control module 1003.

The obtaining module 1001 is configured to obtain, based on data of a plurality of target frames corresponding to a target time slice, a first target parameter that needs to be met by a camera in the target time slice. The first target parameter includes at least one of a first position parameter or a first scaling parameter.

The determining module 1002 is configured to determine a target operation (e.g., movement and scaling) speed of the camera in the target time slice based on the first target parameter, an initial operation (e.g., movement and scaling) speed of the camera in the target time slice, a time interval corresponding to the target time slice, and a time-speed change magnification curve. The target operation (e.g., movement and scaling) speed includes at least one of a target translation speed or a target scaling speed.

The control module 1003 is configured to control the camera to move based on the time-speed change magnification curve, the initial operation (e.g., movement and scaling) speed, and the target operation (e.g., movement and scaling) speed.

In some embodiments, the obtaining module 1001 is configured to perform sampling processing on the data of the target frames corresponding to the target time slice, to obtain a sampling parameter corresponding to each target frame; set a weight value for each target frame according to a distance between a timestamp and a start timestamp of the target time slice; and determine the first target parameter that needs to be met by the camera in the target time slice based on the sampling parameter corresponding to each target frame and the weight value corresponding to each target frame.

In some embodiments, the sampling parameter corresponding to each target frame includes a sampling position parameter, and the obtaining module 1001 is further configured to obtain a center position parameter of an interaction object in each target frame based on the data of the target frames; and determine the sampling position parameter corresponding to each target frame based on the center position parameter of the interaction object in each target frame and an assembly position parameter of the interaction object.

In some embodiments, the sampling parameter corresponding to each target frame includes a sampling scaling parameter, and the obtaining module 1001 is further configured to obtain a distance parameter corresponding to each target frame based on the data of the target frames; determine a scaling change magnification corresponding to the distance parameter based on a distance-scaling change magnification curve; and determine the sampling scaling parameter corresponding to each target frame based on the scaling change magnification.

In some embodiments, the determining module 1002 is configured to obtain a steering angle corresponding to the target time slice based on a first operation (e.g., movement and scaling) direction and a second operation (e.g., movement and scaling) direction; determine a steering mixed coefficient corresponding to the steering angle; update the initial operation (e.g., movement and scaling) speed based on the steering mixed coefficient, to obtain an updated initial operation (e.g., movement and scaling) speed; and determine the target operation (e.g., movement and scaling) speed of the camera in the target time slice based on the first target parameter, the updated initial operation (e.g., movement and scaling) speed, the time interval corresponding to the target time slice, and the time-speed change magnification curve.

In some embodiments, the determining module 1002 is configured to obtain a change parameter of the camera in the target time slice based on a second target parameter that has been met by the camera in the target time slice and the first target parameter, where the second target parameter includes at least one of a second position parameter or a second scaling parameter; obtain a point value corresponding to the time-speed change magnification curve; and determine the target operation (e.g., movement and scaling) speed of the camera in the target time slice based on the change parameter, the initial operation (e.g., movement and scaling) speed, the time interval corresponding to the target time slice, and the point value corresponding to the time-speed change magnification curve.

In some embodiments, the control module 1003 is configured to divide a process of controlling the camera to move into a reference number of subprocesses; determine a speed change magnification corresponding to any subprocess based on a time parameter corresponding to the any subprocess and the time-speed change magnification curve; determine a sub-operation (e.g., movement and scaling) speed corresponding to the any subprocess based on the initial operation (e.g., movement and scaling) speed, the target operation (e.g., movement and scaling) speed, and the speed change magnification corresponding to the any subprocess; and control the camera to move according to the sub-operation (e.g., movement and scaling) speed corresponding to the any subprocess in a time interval corresponding to the any subprocess.

Figure 11:
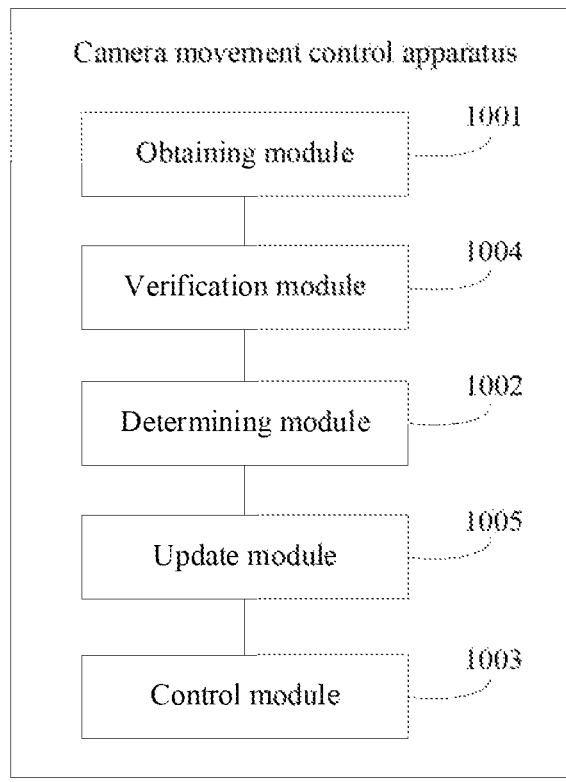
FIG. 11 is a schematic diagram of a camera operation (e.g., movement and scaling) control apparatus according to an embodiment of this disclosure.

In some embodiments, referring to FIG. 11, the apparatus further includes a verification module 1004.

The verification module 1004 is configured to perform validity verification on the first target parameter based on a parameter change threshold, and the determining module 1002 is further configured to determine the target operation (e.g., movement and scaling) speed of the camera in the target time slice based on the first target parameter passing the validity verification, the initial operation (e.g., movement and scaling) speed of the camera in the target time slice, the time interval corresponding to the target time slice, and the time-speed change magnification curve.

In some embodiments, referring to FIG. 11, the apparatus further includes an update module 1005.

The update module 1005 is configured to update the target operation (e.g., movement and scaling) speed based on a correction coefficient, to obtain an updated target operation (e.g., movement and scaling) speed, and the control module 1003 is further configured to control the camera to move based on the time-speed change magnification curve, the initial operation (e.g., movement and scaling) speed, and the target operation (e.g., movement and scaling) speed, to meet the first target parameter.

In some embodiments, the time-speed change magnification curve is a Bezier curve.

In the embodiments of this disclosure, the first target parameter that needs to be met by the camera in the target time slice is obtained based on the data of the plurality of target frames, so that the reliability of the first target parameter is relatively high, which helps improve the stability of camera operation (e.g., movement and scaling). In addition, the camera operation (e.g., movement and scaling) is controlled based on a time-speed change magnification curve, which helps improve the operation (e.g., movement and scaling) continuity of the camera between adjacent time slices, so that the stability of the operation (e.g., movement and scaling) process of the camera is relatively high, and the camera operation (e.g., movement and scaling) control effect is relatively good.

When the apparatus provided in the foregoing embodiments implements functions of the apparatus, the division of the foregoing functional modules is merely an example for description. During actual application, the functions may be assigned to and completed by different functional modules according to the requirements, that is, the internal structure of the device is divided into different functional modules, to implement all or some of the functions described above. In addition, the apparatus and method embodiments provided in the foregoing embodiments belong to the same concept. For the specific implementation process, reference may be made to the method embodiments, and details are not described herein again.

According to some aspects of the disclosure, the embodiments of this disclosure may be implemented in a terminal and/or implemented in a server, and a structure of the terminal is described below.

Figure 12:
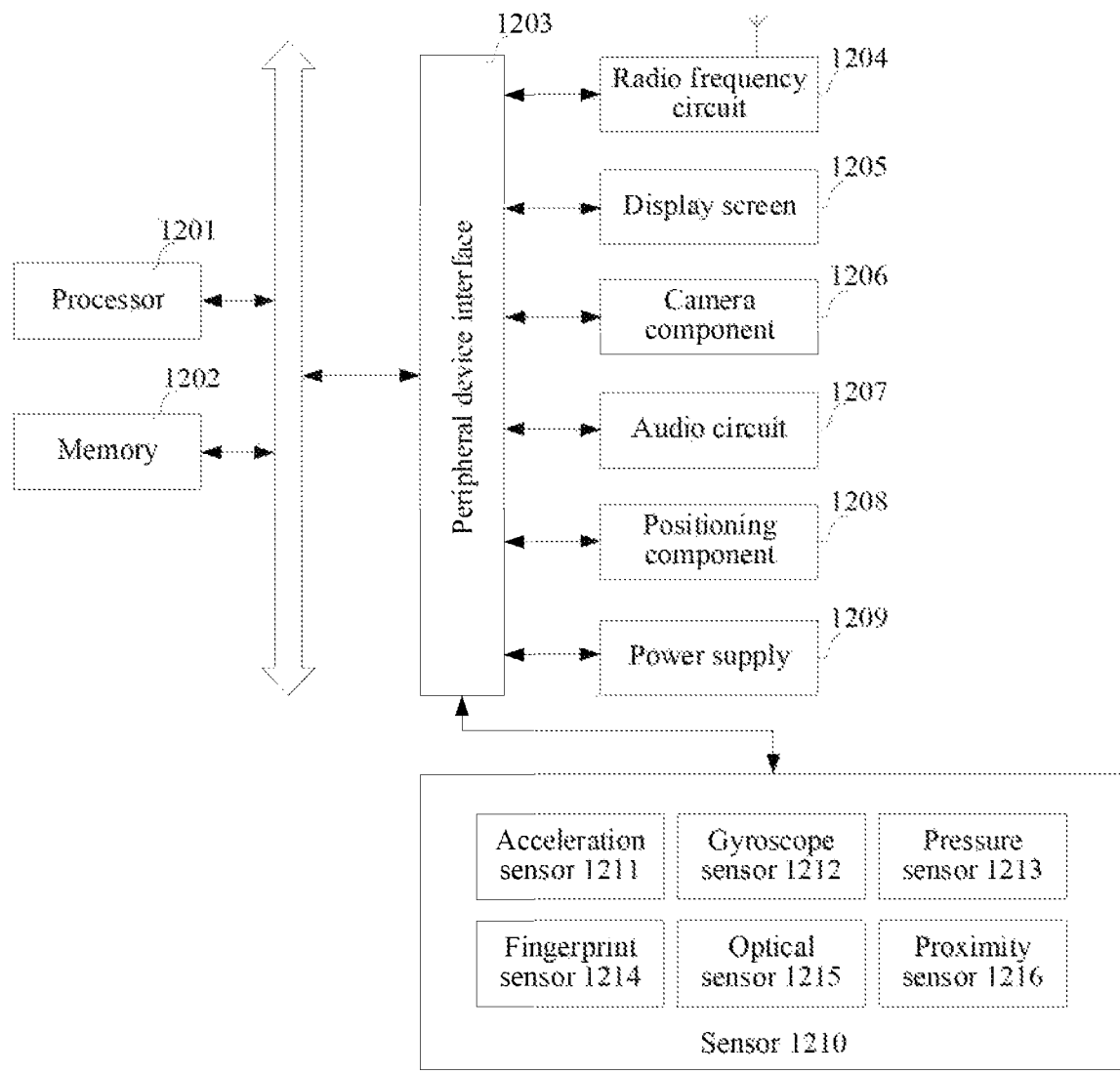
FIG. 12 is a schematic structural diagram of a terminal according to an embodiment of this disclosure.

FIG. 12 is a schematic structural diagram of a terminal according to an embodiment of this disclosure, and a game client is installed in the terminal. The terminal may be a smartphone, a tablet computer, a notebook computer, or a desktop computer. The terminal may also be referred to as user equipment, a portable terminal, a laptop terminal, or a desktop terminal, among other names.

Generally, the terminal includes a processor 1201 and a memory 1202.

The processor 1201 may include one or more processing cores, for example, a 4-core processor or an 8-core processor. The processor 1201 may be implemented by using at least one hardware form of a digital signal processor (DSP), a field-programmable gate array (FPGA), and a programmable logic array (PLA). The processor 1201 may also include a main processor and a coprocessor. The main processor is a processor configured to process data in an awake state, and is also referred to as a central processing unit (CPU). The coprocessor is a low power consumption processor configured to process the data in a standby state. In some embodiments, the processor 1201 may be integrated with a graphics processing unit (GPU). The GPU is configured to render and draw content that needs to be displayed on a display. In some embodiments, the processor 1201 may further include an artificial intelligence (AI) processor. The AI processor is configured to process computing operations related to machine learning.

The memory 1202 may include one or more computer-readable storage media. The computer-readable storage medium may be non-transient. The memory 1202 may further include a high-speed random access memory and a non-volatile memory, for example, one or more disk storage devices or flash storage devices. In some embodiments, the non-transient computer-readable storage medium in the memory 1202 is configured to store at least one instruction, and the at least one instruction is configured to be executed by the processor 1201 to perform the following steps:

obtaining, based on data of a plurality of target frames corresponding to a target time slice, a first target parameter that needs to be met by a camera in the target time slice, the first target parameter including at least one of a first position parameter or a first scaling parameter;

determining a target operation (e.g., movement and scaling) speed of the camera in the target time slice based on the first target parameter, an initial operation (e.g., movement and scaling) speed of the camera in the target time slice, a time interval corresponding to the target time slice, and a time-speed change magnification curve, the target operation (e.g., movement and scaling) speed including at least one of a target translation speed or a target scaling speed; and controlling the camera to move based on the time-speed change magnification curve, the initial operation (e.g., movement and scaling) speed, and the target operation (e.g., movement and scaling) speed.

In some embodiments, the processor is configured to perform the following steps:

performing sampling processing on the data of the target frames corresponding to the target time slice, to obtain a sampling parameter corresponding to each target frame;

setting a weight value for each target frame according to a distance between a timestamp and a start timestamp of the target time slice; and determining the first target parameter that needs to be met by the camera in the target time slice based on the sampling parameter corresponding to each target frame and the weight value corresponding to each target frame.

In some embodiments, the sampling parameter corresponding to each target frame includes a sampling position parameter, and the processor is configured to perform the following steps:

obtaining a center position parameter of an interaction object in each target frame based on the data of the target frames; and determining the sampling position parameter corresponding to each target frame based on the center position parameter of the interaction object in each target frame and an assembly position parameter of the interaction object.

In some embodiments, the sampling parameter corresponding to each target frame includes a sampling scaling parameter, and the processor is configured to perform the following steps:

obtaining a distance parameter corresponding to each target frame based on the data of the target frames;

determining a scaling change magnification corresponding to the distance parameter based on a distance-scaling change magnification curve; and determining the sampling scaling parameter corresponding to each target frame based on the scaling change magnification.

In some embodiments, the processor is configured to perform the following steps:

obtaining a steering angle corresponding to the target time slice based on a first operation (e.g., movement and scaling) direction and a second operation (e.g., movement and scaling) direction;

determining a steering mixed coefficient corresponding to the steering angle;

updating the initial operation (e.g., movement and scaling) speed based on the steering mixed coefficient, to obtain an updated initial operation (e.g., movement and scaling) speed; and determining the target operation (e.g., movement and scaling) speed of the camera in the target time slice based on the first target parameter, the updated initial operation (e.g., movement and scaling) speed, the time interval corresponding to the target time slice, and the time-speed change magnification curve.

In some embodiments, the processor is configured to perform the following steps:

obtaining a change parameter of the camera in the target time slice based on a second target parameter that has been met by the camera in the target time slice and the first target parameter, where the second target parameter includes at least one of a second position parameter or a second scaling parameter;

obtaining a point value corresponding to the time-speed change magnification curve; and determining the target operation (e.g., movement and scaling) speed of the camera in the target time slice based on the change parameter, the initial operation (e.g., movement and scaling) speed, the time interval corresponding to the target time slice, and the point value corresponding to the time-speed change magnification curve.

In some embodiments, the processor is configured to perform the following steps:

dividing a process of controlling the camera to move into a reference number of subprocesses;

determining a speed change magnification corresponding to any subprocess based on a time parameter corresponding to the any subprocess and the time-speed change magnification curve;

determining a sub-operation (e.g., movement and scaling) speed corresponding to the any subprocess based on the initial operation (e.g., movement and scaling) speed, the target operation (e.g., movement and scaling) speed, and the speed change magnification corresponding to the any subprocess; and controlling the camera to move according to the sub-operation (e.g., movement and scaling) speed corresponding to the any subprocess in a time interval corresponding to the any subprocess.

In some embodiments, the processor is further configured to perform the following steps:

performing validity verification on the first target parameter based on a parameter change threshold; and the determining a target operation (e.g., movement and scaling) speed of the camera in the target time slice based on the first target parameter, an initial operation (e.g., movement and scaling) speed of the camera in the target time slice, a time interval corresponding to the target time slice, and a time-speed change magnification curve includes:

determining the target operation (e.g., movement and scaling) speed of the camera in the target time slice based on the first target parameter passing the validity verification, the initial operation (e.g., movement and scaling) speed of the camera in the target time slice, the time interval corresponding to the target time slice, and the time-speed change magnification curve.

In some embodiments, the processor is further configured to perform the following steps:

updating the target operation (e.g., movement and scaling) speed based on a correction coefficient, to obtain an updated target operation (e.g., movement and scaling) speed; and the controlling the camera to move based on the time-speed change magnification curve, the initial operation (e.g., movement and scaling) speed, and the target operation (e.g., movement and scaling) speed, to meet the first target parameter includes:

controlling the camera to move based on the time-speed change magnification curve, the initial operation (e.g., movement and scaling) speed, and the updated target operation (e.g., movement and scaling) speed, to meet the first target parameter.

In some embodiments, the time-speed change magnification curve is a Bezier curve.

In some embodiments, the terminal may include a peripheral device interface 1203 and at least one peripheral device. The processor 1201, the memory 1202, and the peripheral device interface 1203 may be connected by using a bus or a signal cable. Each peripheral device may be connected to the peripheral device interface 1203 by using a bus, a signal cable, or a circuit board. Specifically, the peripheral device includes: at least one of a radio frequency (RF) circuit 1204, a touch display screen 1205, a camera component 1206, an audio circuit 1207, a positioning component 1208, and a power supply 1209.

The peripheral device interface 1203 may be configured to connect the at least one peripheral device related to input/output (I/O) to the processor 1201 and the memory 1202. In some embodiments, the processor 1201, the memory 1202, and the peripheral device interface 1203 are integrated on a same chip or circuit board. In some other embodiments, any one or two of the processor 1201, the memory 1202, and the peripheral device interface 1203 may be implemented on a single chip or circuit board. This is not limited in this embodiment.

The RF circuit 1204 is configured to receive and transmit an RF signal, also referred to as an electromagnetic signal. The RF circuit 1204 communicates with a communication network and other communication devices through the electromagnetic signal. The RF circuit 1204 converts an electrical signal into an electromagnetic signal for transmission, or converts a received electromagnetic signal into an electrical signal. In some examples, the RF circuit 1204 includes: an antenna system, an RF transceiver, one or more amplifiers, a tuner, an oscillator, a digital signal processor, a codec chip set, a subscriber identity module card, and the like. The RF circuit 1204 may communicate with another terminal by using at least one wireless communication protocol. The wireless communication protocol includes, but is not limited to, a metropolitan area network, different generations of mobile communication networks (2G, 3G, 4G, and 5G), a wireless local area network, and/or a Wi-Fi network. In some embodiments, the RF 1204 may further include a circuit related to NFC, which is not limited in this disclosure.

The display screen 1205 is configured to display a user interface (UI). The UI may include a graph, text, an icon, a video, and any combination thereof. When the display screen 1205 is a touch display screen, the display screen 1205 is further capable of collecting touch signals on or above a surface of the display screen 1205. The touch signal may be inputted to the processor 1201 as a control signal for processing. In this case, the display screen 1205 may be further configured to provide a virtual button and/or a virtual keyboard that are/is also referred to as a soft button and/or a soft keyboard. In some embodiments, there may be one display screen 1205, disposed on a front panel of the terminal. In some other embodiments, there may be at least two display screens 1205 that are respectively disposed on different surfaces of the terminal or in a folded design. In still other embodiments, the display screen 1205 may be a flexible display screen disposed on a curved surface or a folded surface of the terminal. Even, the display screen 1205 may be further set in a non-rectangular irregular pattern, namely, a special-shaped screen. The display screen 1205 may be prepared by using materials such as a liquid-crystal display (LCD), an organic light-emitting diode (OLED), or the like.

The camera component 1206 is configured to collect images or videos. In some examples, the camera component 1206 includes a front-facing camera and a rear-facing camera. Generally, the front-facing camera is disposed on the front panel of the terminal, and the rear-facing camera is disposed on a back surface of the terminal. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 1206 may further include a flash. The flash may be a monochrome temperature flash, or may be a double color temperature flash. The double color temperature flash refers to a combination of a warm light flash and a cold light flash, and may be used for light compensation under different color temperatures.

The audio circuit 1207 may include a microphone and a speaker. The microphone is configured to acquire sound waves of a user and an environment, and convert the sound waves into an electrical signal to input to the processor 1201 for processing, or input to the RF circuit 1204 for implementing voice communication. For the purpose of stereo sound collection or noise reduction, there may be a plurality of microphones, respectively disposed at different portions of the terminal. The microphone may further be an array microphone or an omni-directional acquisition type microphone. The speaker is configured to convert electric signals from the processor 1201 or the RF circuit 1204 into sound waves. The speaker may be a conventional film speaker, or may be a piezoelectric ceramic speaker. When the speaker is the piezoelectric ceramic speaker, the speaker not only can convert an electric signal into acoustic waves audible to a human being, but also can convert an electric signal into acoustic waves inaudible to a human being, for ranging and other purposes. In some embodiments, the audio circuit 1207 may further include an earphone jack.

The positioning component 1208 is configured to position a current geographic location of the terminal, to implement a navigation or a location based service (LBS). The positioning component 1208 may be a positioning component based on the Global Positioning System (GPS) of the United States, the BeiDou system of China, the GLONASS System of Russia, or the GALILEO System of the European Union.

The power supply 1209 is configured to supply power to components in the terminal. The power supply 1209 may be an alternating current, a direct current, a primary battery, or a rechargeable battery. In a case that the power supply 1209 includes the rechargeable battery, the rechargeable battery may support wired charging or wireless charging. The rechargeable battery may be further configured to support a fast charging technology.

In some embodiments, the terminal may further include one or more sensors 1210. The one or more sensors 1210 include, but are not limited to: an acceleration sensor 1211, a gyroscope sensor 1212, a pressure sensor 1213, a fingerprint sensor 1214, an optical sensor 1215, and a proximity sensor 1216.

The acceleration sensor 1211 can detect a magnitude of acceleration on three coordinate axes of a coordinate system established based on the terminal. For example, the acceleration sensor 1211 can be configured to detect components of gravity acceleration on three coordinate axes. The processor 1201 may control, according to a gravity acceleration signal acquired by the acceleration sensor 1211, the touch display screen 1205 to display the UI in a landscape view or a portrait view. The acceleration sensor 1211 may be further configured to acquire motion data of a game or a user.

The gyroscope sensor 1212 may detect a body direction and a rotation angle of the terminal, and the gyroscope sensor 1212 may work with the acceleration sensor 1211 to acquire a 3D action performed by the user on the terminal. The processor 1201 may implement the following functions according to data acquired by the gyroscope sensor 1212: motion sensing (for example, the UI is changed according to a tilt operation of the user), image stabilization during shooting, game control, and inertial navigation.

The pressure sensor 1213 may be disposed at a side frame of the terminal and/or a lower layer of the display screen 1205. When the pressure sensor 1213 is disposed at the side frame of the terminal, a holding signal of the user for the terminal can be detected for the processor 1201 to perform left and right hand recognition or quick operations according to the holding signal acquired by the pressure sensor 1213. When the pressure sensor 1213 is disposed on the lower layer of the touch display screen 1205, the processor 1201 controls, according to a pressure operation of the user on the touch display screen 1205, an operable control on the UI. The operable control includes at least one of a button control, a scroll-bar control, an icon control, and a menu control.

The fingerprint sensor 1214 is configured to acquire a user's fingerprint, and the processor 1201 identifies a user's identity according to the fingerprint acquired by the fingerprint sensor 1214, or the fingerprint sensor 1214 identifies a user's identity according to the acquired fingerprint. When identifying that the user's identity is a trusted identity, the processor 1201 authorizes the user to perform related sensitive operations. The sensitive operations include: unlocking a screen, viewing encrypted information, downloading software, paying, changing a setting, and the like. The fingerprint sensor 1214 may be disposed on a front surface, a back surface, or a side surface of the terminal. When a physical button or a vendor logo is disposed on the terminal, the fingerprint sensor 1214 may be integrated with the physical button or the vendor logo.

The optical sensor 1215 is configured to acquire ambient light intensity. In an embodiment, the processor 1201 may control the display brightness of the touch display screen 1205 according to the ambient light intensity acquired by the optical sensor 1215. Specifically, when the ambient light intensity is relatively high, the display brightness of the touch display screen 1205 is increased. When the ambient light intensity is relatively low, the display brightness of the touch display screen 1205 is decreased. In another embodiment, the processor 1201 may further dynamically adjust a camera parameter of the camera component 1206 according to the ambient light intensity acquired by the optical sensor 1215.

The proximity sensor 1216 is also referred to as a distance sensor and is generally disposed at the front panel of the terminal. The proximity sensor 1216 is configured to acquire a distance between the user and the front face of the terminal. In an embodiment, when the proximity sensor 1216 detects that the distance between the user and the front surface of the terminal gradually becomes small, the touch display screen 1201 is controlled by the processor 1205 to switch from a screen-on state to a screen-off state. When the proximity sensor 1216 detects that the distance between the user and the front surface of the terminal gradually increases, the touch display screen 1205 is controlled by the processor 1201 to switch from the screen-off state to the screen-on state.

It is noted that a structure shown in FIG. 12 constitutes no limitation on the terminal. The terminal may include more or fewer components than those shown in the drawings, some components may be combined, and a different component deployment may be used.

Figure 13:
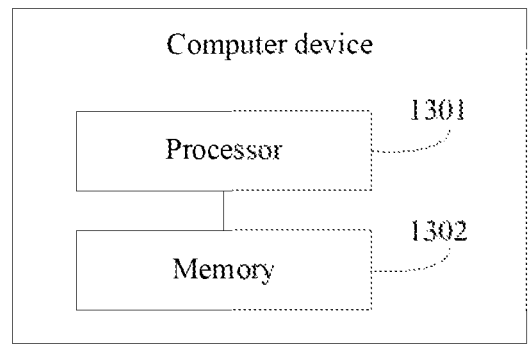
FIG. 13 is a schematic structural diagram of a computer device according to an embodiment of this disclosure.

In an exemplary embodiment, a server is further provided. Referring to FIG. 13, the server includes a processor 1301 and a memory 1302, and the memory 1302 stores at least one piece of program code. The at least one piece of program code is loaded and executed by one or more processors 1301, to implement any camera operation (e.g., movement and scaling) control method described above.

In an exemplary embodiment, a computer-readable storage medium is further provided, storing at least one piece of program code, the at least one piece of program code being loaded and executed by a processor of a computer device to perform the following steps:

obtaining, based on data of a plurality of target frames corresponding to a target time slice, a first target parameter that needs to be met by a camera in the target time slice, the first target parameter including at least one of a first position parameter or a first scaling parameter;

determining a target operation (e.g., movement and scaling) speed of the camera in the target time slice based on the first target parameter, an initial operation (e.g., movement and scaling) speed of the camera in the target time slice, a time interval corresponding to the target time slice, and a time-speed change magnification curve, the target operation (e.g., movement and scaling) speed including at least one of a target translation speed or a target scaling speed; and controlling the camera to move based on the time-speed change magnification curve, the initial operation (e.g., movement and scaling) speed, and the target operation (e.g., movement and scaling) speed.

In some embodiments, the processor is configured to perform the following steps:

performing sampling processing on the data of the target frames corresponding to the target time slice, to obtain a sampling parameter corresponding to each target frame;

setting a weight value for each target frame according to a distance between a timestamp and a start timestamp of the target time slice; and determining the first target parameter that needs to be met by the camera in the target time slice based on the sampling parameter corresponding to each target frame and the weight value corresponding to each target frame.

In some embodiments, the sampling parameter corresponding to each target frame includes a sampling position parameter, and the processor is configured to perform the following steps:

obtaining a center position parameter of an interaction object in each target frame based on the data of the target frames; and determining the sampling position parameter corresponding to each target frame based on the center position parameter of the interaction object in each target frame and an assembly position parameter of the interaction object.

In some embodiments, the sampling parameter corresponding to each target frame includes a sampling scaling parameter, and the processor is configured to perform the following steps:

obtaining a distance parameter corresponding to each target frame based on the data of the target frames;

determining a scaling change magnification corresponding to the distance parameter based on a distance-scaling change magnification curve; and determining the sampling scaling parameter corresponding to each target frame based on the scaling change magnification.

In some embodiments, the processor is configured to perform the following steps:

obtaining a steering angle corresponding to the target time slice based on a first operation (e.g., movement and scaling) direction and a second operation (e.g., movement and scaling) direction;

determining a steering mixed coefficient corresponding to the steering angle;

updating the initial operation (e.g., movement and scaling) speed based on the steering mixed coefficient, to obtain an updated initial operation (e.g., movement and scaling) speed; and determining the target operation (e.g., movement and scaling) speed of the camera in the target time slice based on the first target parameter, the updated initial operation (e.g., movement and scaling) speed, the time interval corresponding to the target time slice, and the time-speed change magnification curve.

In some embodiments, the processor is configured to perform the following steps:

obtaining a change parameter of the camera in the target time slice based on a second target parameter that has been met by the camera in the target time slice and the first target parameter, where the second target parameter includes at least one of a second position parameter or a second scaling parameter;

obtaining a point value corresponding to the time-speed change magnification curve; and determining the target operation (e.g., movement and scaling) speed of the camera in the target time slice based on the change parameter, the initial operation (e.g., movement and scaling) speed, the time interval corresponding to the target time slice, and the point value corresponding to the time-speed change magnification curve.

In some embodiments, the processor is configured to perform the following steps:

dividing a process of controlling the camera to move into a reference number of subprocesses;

determining a speed change magnification corresponding to any subprocess based on a time parameter corresponding to the any subprocess and the time-speed change magnification curve;

determining a sub-operation (e.g., movement and scaling) speed corresponding to the any subprocess based on the initial operation (e.g., movement and scaling) speed, the target operation (e.g., movement and scaling)

speed, and the speed change magnification corresponding to the any subprocess; and controlling the camera to move according to the sub-operation (e.g., movement and scaling) speed corresponding to the any subprocess in a time interval corresponding to the any subprocess.

In some embodiments, the processor is further configured to perform the following steps:

performing validity verification on the first target parameter based on a parameter change threshold; and the determining a target operation (e.g., movement and scaling) speed of the camera in the target time slice based on the first target parameter, an initial operation (e.g., movement and scaling) speed of the camera in the target time slice, a time interval corresponding to the target time slice, and a time-speed change magnification curve includes:

determining the target operation (e.g., movement and scaling) speed of the camera in the target time slice based on the first target parameter passing the validity verification, the initial operation (e.g., movement and scaling) speed of the camera in the target time slice, the time interval corresponding to the target time slice, and the time-speed change magnification curve.

In some embodiments, the processor is further configured to perform the following steps:

updating the target operation (e.g., movement and scaling) speed based on a correction coefficient, to obtain an updated target operation (e.g., movement and scaling) speed; and the controlling the camera to move based on the time-speed change magnification curve, the initial operation (e.g., movement and scaling) speed, and the target operation (e.g., movement and scaling) speed, to meet the first target parameter includes:

controlling the camera to move based on the time-speed change magnification curve, the initial operation (e.g., movement and scaling) speed, and the updated target operation (e.g., movement and scaling) speed, to meet the first target parameter.

In some embodiments, the time-speed change magnification curve is a Bezier curve.

In some embodiments, the computer-readable storage medium may be a read-only memory (ROM), a random access memory (random-access memory, RAM), a compact disc read-only memory (CD-ROM), a magnetic tape, a floppy disk, an optical data storage device, and the like.

It is noted that one or more modules, submodules, and/or units in the present disclosure can be implemented by processing circuitry, software, or a combination thereof, for example. The term module (and other similar terms such as unit, submodule, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

"Plurality of" mentioned in this specification means two or more. "And/or" describes an association relationship for describing associated objects and represents that three relationships may exist. For example, A and/or B may represent the following three cases: Only A exists, both A and B exist, and only B exists. The character "/" in this specification generally indicates an "or" relationship between the associated objects.

The foregoing descriptions are merely exemplary embodiments of this disclosure, but are not intended to limit this disclosure. Any modification, equivalent replacement, or improvement made within the spirit and principle of this disclosure shall fall within the protection scope of this disclosure.

What is claimed is:

1. A method for camera operation control in an electronic device, comprising:

obtaining, by processing circuitry and based on a plurality of frames associated with a target time slice, a first target parameter including at least one of a position to be focused by a virtual camera and a zoom of the virtual camera in the target time slice;

determining, by the processing circuitry, a target operation speed of changing the at least one of the position and the zoom of the virtual camera in the target time slice at least partially based on the first target parameter and a time-speed change magnification curve indicating a relationship between time within the target time slice and a speed change associated with changing the at least one of the position and the zoom of the virtual camera; and generating a view of a virtual scene by controlling the virtual camera to operate based on the determined target operation speed.

2. The method according to claim 1, wherein the obtaining the first target parameter comprises:

determining at least a first sampling parameter associated with a first frame in the plurality of frames, and a second sampling parameter associated with a second frame in the plurality of frames;

setting at least a first weight value associated with the first frame according to a first distance between a first timestamp of the first frame and a start timestamp of the target time slice, and a second weight value associated with the second frame according to a second distance between a second timestamp of the second frame and the start timestamp of the target time slice; and determining the first target parameter based on at least a first combination of the first sampling parameter and the first weight value and a second combination of the second sampling parameter and the second weight value.

3. The method according to claim 2, wherein the first target parameter comprises a first position parameter indicating the position to be focused by the virtual camera, the target operation speed comprises a target translation speed of changing the position of the virtual camera, the first sampling parameter comprises a sampling position parameter, and the determining the first sampling parameter comprises:

determining a center position parameter of one or more interaction objects in the first frame; and determining the sampling position parameter associated with the first frame based on the center position parameter and an assembly position parameter of the one or more interaction objects.

4. The method according to claim 2, wherein the first target parameter comprises a first scaling parameter indicating the zoom of the virtual camera, the target operation speed comprises a target scaling speed of changing the zoom of the virtual camera, the first sampling parameter comprises a sampling scaling parameter, and the determining the first sampling parameter comprises:
  determining a distance parameter of the first frame;
  determining a scaling change magnification corresponding to the distance parameter based on a distance-scaling change magnification curve; and
  determining the sampling scaling parameter of the first frame based on the scaling change magnification.

5. The method according to claim 1, wherein the determining the target operation speed of the virtual camera comprises:
  determining a steering angle associated with the target time slice based on a first operation direction at a start of the target time slice and a second operation direction at an end of the target time slice;
  determining a steering mixed coefficient based on the steering angle;
  updating an initial operation speed based on the steering mixed coefficient, to obtain an updated initial operation speed; and
  determining the target operation speed of the virtual camera in the target time slice based on the first target parameter, the updated initial operation speed, a time interval corresponding to the target time slice, and the time-speed change magnification curve.

6. The method according to claim 1, wherein the determining the target operation speed of the virtual camera comprises:
  obtaining a change parameter of the virtual camera in the target time slice based on the first target parameter and a second target parameter to be met by the virtual camera in the target time slice at a different time from the first target parameter;
  obtaining an integral value based on the time-speed change magnification curve; and
  determining the target operation speed of the virtual camera in the target time slice based on the change parameter, an initial operation speed, a time interval corresponding to the target time slice, and the integral value.

7. The method according to claim 1, wherein the generating the view of the virtual scene comprises:
  determining speed change magnification values respectively associated with sub time intervals of the target time slice based on the sub time intervals and the time-speed change magnification curve;
  determining respective sub-operation speed values associated with the sub time intervals based on an initial operation speed, the target operation speed, and the speed change magnification values associated with the sub time intervals; and
  generating the view of the virtual scene by controlling the virtual camera to operate according to the sub-operation speed values associated with the sub time intervals in the respective sub time intervals.

8. The method according to claim 1, wherein after the obtaining the first target parameter, the method further comprises:
  performing a validity verification on the first target parameter based on a parameter change threshold; and
  in response to a passing of the validity verification, determining the target operation speed of the virtual camera in the target time slice at least partially based on the first target parameter.

9. The method according to claim 1, wherein
after the determining the target operation speed of the virtual camera in the target time slice, the method further comprises:
  updating the target operation speed based on a correction coefficient, to obtain an updated target operation speed; and
the generating the view of the virtual scene comprises:
  generating the view of the virtual scene by controlling the virtual camera to operate based on the time-speed change magnification curve, an initial movement speed, and the updated target operation speed, to meet the first target parameter.

10. The method according to claim 1, wherein the time-speed change magnification curve is a Bezier curve.

11. An apparatus, comprising
processing circuitry configured to:
  obtain, based on a plurality of frames associated with a target time slice, a first target parameter including at least one of a position to be focused by a virtual camera and a zoom of the virtual camera in the target time slice;
  determine a target operation speed of changing the at least one of the position and the zoom of the virtual camera in the target time slice at least partially based on the first target parameter and a time-speed change magnification curve indicating a relationship between time within the target time slice and a speed change associated with changing the at least one of the position and the zoom of the virtual camera; and
  generate a view of a virtual scene by controlling the virtual camera to operate based on the determined target operation speed.

12. The apparatus according to claim 11, wherein the processing circuitry is further configured to:
  determine at least a first sampling parameter associated with a first frame in the plurality of frames, and a second sampling parameter associated with a second frame in the plurality of frames;
  set at least a first weight value associated with the first frame according to a first distance between a first timestamp of the first frame and a start timestamp of the target time slice, and a second weight value associated with the second frame according to a second distance between a second timestamp of the second frame and the start timestamp of the target time slice; and
  determine the first target parameter based on at least a first combination of the first sampling parameter and the first weight value and a second combination of the second sampling parameter and the second weight value.

13. The apparatus according to claim 12, wherein the first target parameter comprises a first position parameter indicating the position to be focused by the virtual camera,
the target operation speed comprises a target translation speed of changing the position of the virtual camera,
the first sampling parameter comprises a sampling position parameter, and
the processing circuitry is configured to:
  determine a center position parameter of one or more interaction objects in the first frame; and
  determine the sampling position parameter associated with the first frame based on the center position parameter and an assembly position parameter of the one or more interaction objects.

14. The apparatus according to claim 12, wherein
the first target parameter comprises a first scaling parameter indicating the zoom of the virtual camera,
the target operation speed comprises a target scaling speed of changing the zoom of the virtual camera,
the first sampling parameter comprises a sampling scaling parameter, and
the processing circuitry is configured to:
  determine a distance parameter of the first frame;
  determine a scaling change magnification corresponding to the distance parameter based on a distance-scaling change magnification curve; and
  determine the sampling scaling parameter of the first frame based on the scaling change magnification.

15. The apparatus according to claim 11, wherein the processing circuitry is configured to:
  determine a steering angle associated with the target time slice based on a first operation direction at a start of the target time slice and a second operation direction at an end of the target time slice;
  determine a steering mixed coefficient based on the steering angle;
  update an initial operation speed based on the steering mixed coefficient, to obtain an updated initial operation speed; and
  determine the target operation speed of the virtual camera in the target time slice based on the first target parameter, the updated initial operation speed, a time interval corresponding to the target time slice, and the time-speed change magnification curve.

16. The apparatus according to claim 11, wherein the processing circuitry is configured to:
  obtain a change parameter of the virtual camera in the target time slice based on the first target parameter and a second target parameter to be met by the virtual camera in the target time slice at a different time from the first target parameter;
  obtain an integral value based on the time-speed change magnification curve; and
  determine the target operation speed of the virtual camera in the target time slice based on the change parameter, an initial operation speed, a time interval corresponding to the target time slice, and the integral value.

17. The apparatus according to claim 11, wherein the processing circuitry is configured to:
  determine speed change magnification values respectively associated with sub time intervals of the target time slice based on the sub time intervals and the time-speed change magnification curve;
  determine respective sub-operation speed values associated with the sub time intervals based on an initial operation speed, the target operation speed, and the speed change magnification values associated with the sub time intervals; and
  generate the view of the virtual scene by controlling the virtual camera to operate according to the sub-operation speed values associated with the sub time intervals in the respective sub time intervals.

18. The apparatus according to claim 11, wherein after the first target parameter is obtained, the processing circuitry is configured to:
  perform a validity verification on the first target parameter based on a parameter change threshold; and
  in response to a passing of the validity verification, determine the target operation speed of the virtual camera in the target time slice at least partially based on the first target parameter.

19. The apparatus according to claim 11, wherein after the target operation speed of the virtual camera in the target time slice is determined, the processing circuitry is configured to:
  update the target operation speed based on a correction coefficient, to obtain an updated target operation speed; and
  generate the view of the virtual scene by controlling the virtual camera to operate based on the time-speed change magnification curve, an initial movement speed, and the updated target operation speed, to meet the first target parameter.

20. A non-transitory computer-readable medium storing instructions which when executed by processing circuitry causing the processing circuitry to perform:
  obtaining, based on a plurality of frames associated with a target time slice, a first target parameter including at least one of a position to be focused by a virtual camera and a zoom of the virtual camera in the target time slice;
  determining a target operation speed of changing the at least one of the position and the zoom of the virtual camera in the target time slice at least partially based on the first target parameter and a time-speed change magnification curve indicating a relationship between time within the target time slice and a speed change associated with changing the at least one of the position and the zoom of the virtual camera; and
  generating a view of a virtual scene by controlling the virtual camera to operate based on the determined target operation speed.

\* \* \* \* \*